United States Patent [19]

Beals

[11] 4,185,521
[45] Jan. 29, 1980

[54] HYDRAULIC CONTROL SYSTEM FOR A HYDROSTATIC-MECHANICAL TRANSMISSION

[75] Inventor: Charles E. Beals, Pekin, Ill.

[73] Assignee: Caterpillar Tractor Co., Peoria, Ill.

[21] Appl. No.: 851,006

[22] Filed: Nov. 14, 1977

Related U.S. Application Data

[63] Continuation-in-part of Ser. No. 556,852, Mar. 10, 1975, abandoned.

[51] Int. Cl.² .................. B60K 41/16; F16H 47/00
[52] U.S. Cl. ........................ 74/865; 74/733; 74/687; 74/861
[58] Field of Search ............ 74/687, 733, 740, 730, 74/720.5, 720, 865, 867, 868, 869, 861

[56] References Cited
U.S. PATENT DOCUMENTS

| | | | |
|---|---|---|---|
| 2,808,737 | 10/1957 | Bullard | 74/733 X |
| 3,274,946 | 9/1966 | Simmons | 91/490 |
| 3,381,472 | 5/1968 | Brown et al. | 60/325 |
| 3,463,034 | 8/1969 | Miller | 74/733 |
| 3,477,225 | 11/1969 | Cryder et al. | 60/433 |
| 3,528,322 | 9/1970 | Schou | 74/687 |
| 3,580,107 | 5/1971 | Orshansky, Jr. | 74/687 |
| 3,782,225 | 1/1974 | Grabow | 74/733 |
| 3,864,991 | 2/1975 | Nembach | 74/687 |
| 3,897,697 | 8/1975 | Chambers et al. | 74/687 X |
| 3,899,957 | 8/1975 | Carlson, Jr. et al. | 91/490 |

*Primary Examiner*—Lance Chandler
*Attorney, Agent, or Firm*—Phillips, Moore, Weissenberger, Lempio & Majestic

[57] ABSTRACT

A hydraulic circuit adjusts an infinitely variable drive ratio hydro-mechanical transmission in response to movements of operators speed and torque controls to enable precise selection of the wheel torque of a vehicle and selective variation of ground speed by changing drive ratio while the driving engine operates at a constant engine speed. Control fluid from a pump driven by the engine is used to generate a displacement signal for the hydrostatic section of the transmission. The displacement signal is limited to a value determined by an operators maximum speed selector while being modulated within that limit by means which compare actual output torque with a selected torque signal from the operators controls and which vary the displacement signal to conform output torque with that called for by the operator. The displacement signal is further modified when necessary by engine underspeed and overspeed sensing means responsive to variations in control fluid flow from the pump. Additional means sense extremes of hydrostatic section displacement and automatically shift drive range in the mechanical section of the transmission when necessary to enable continued ground speed variation by drive ratio adjustment.

17 Claims, 13 Drawing Figures

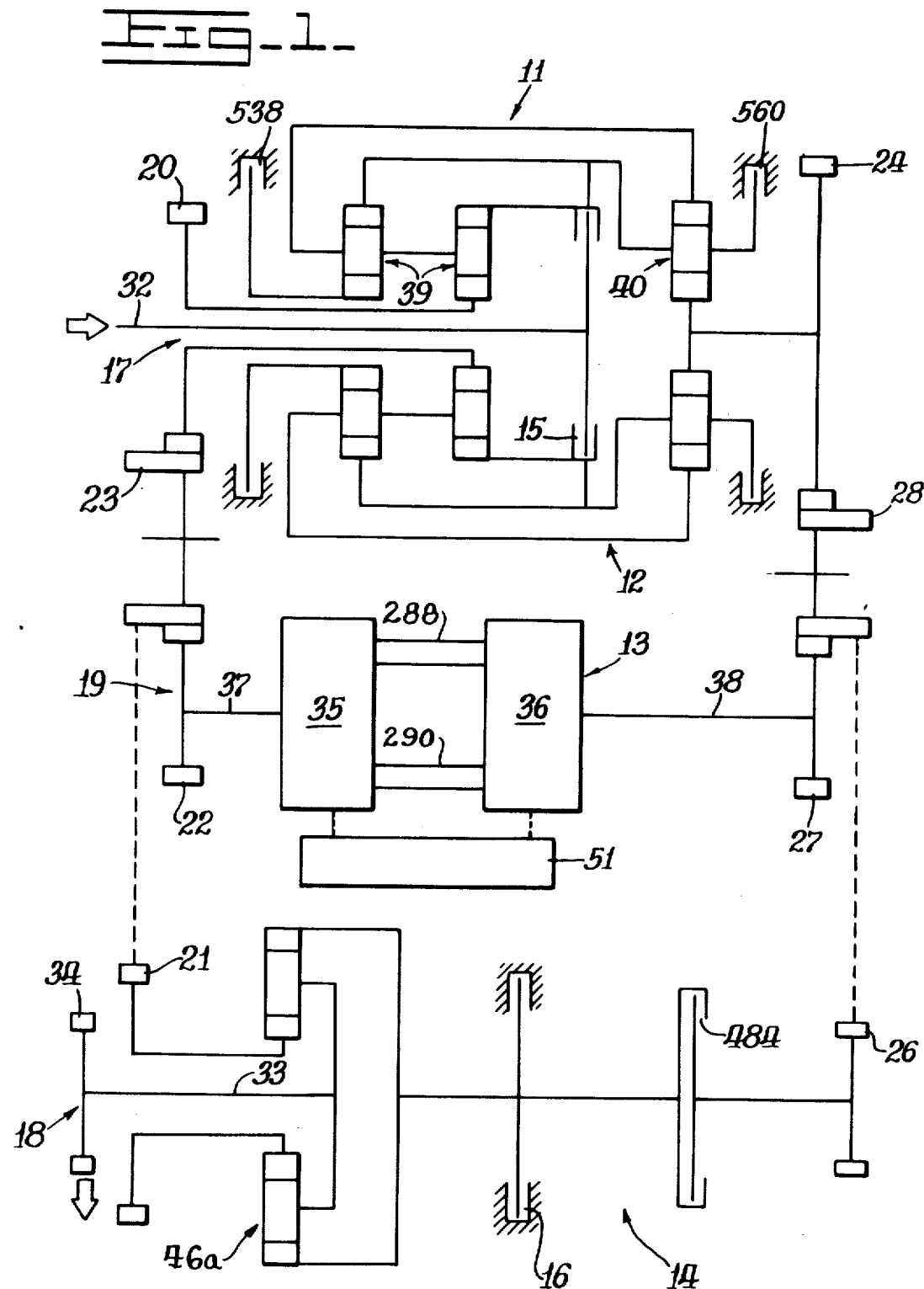

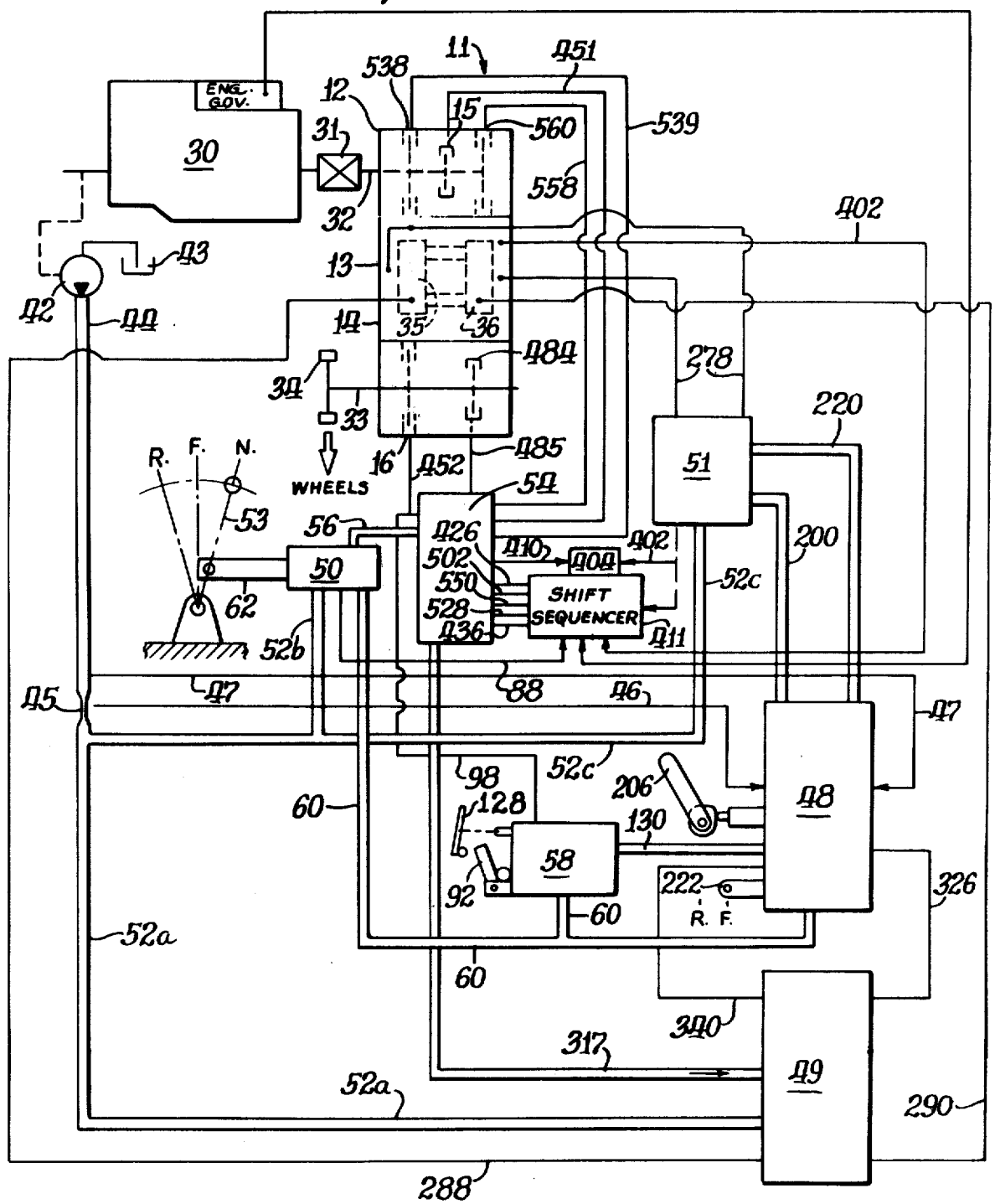

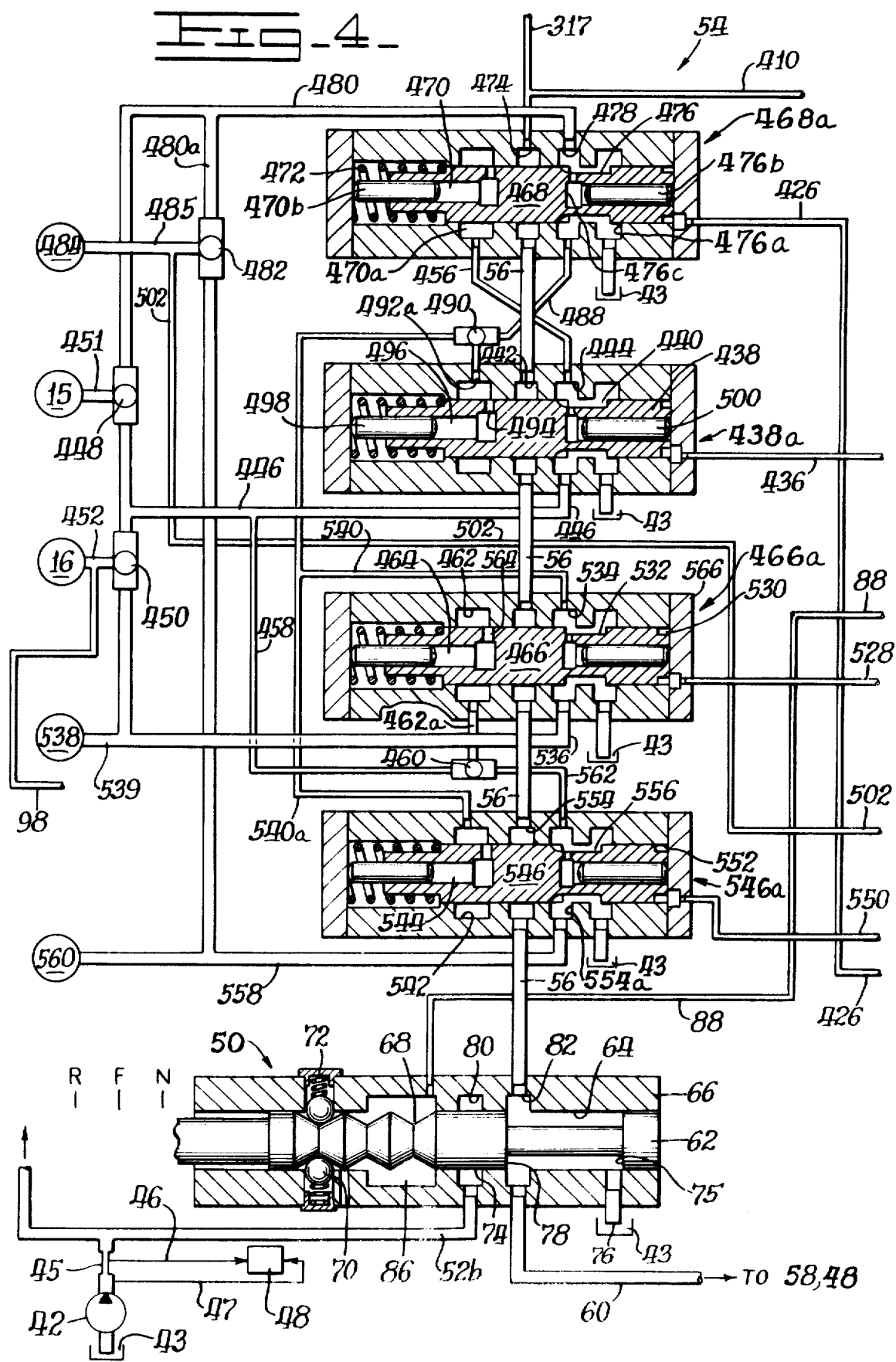

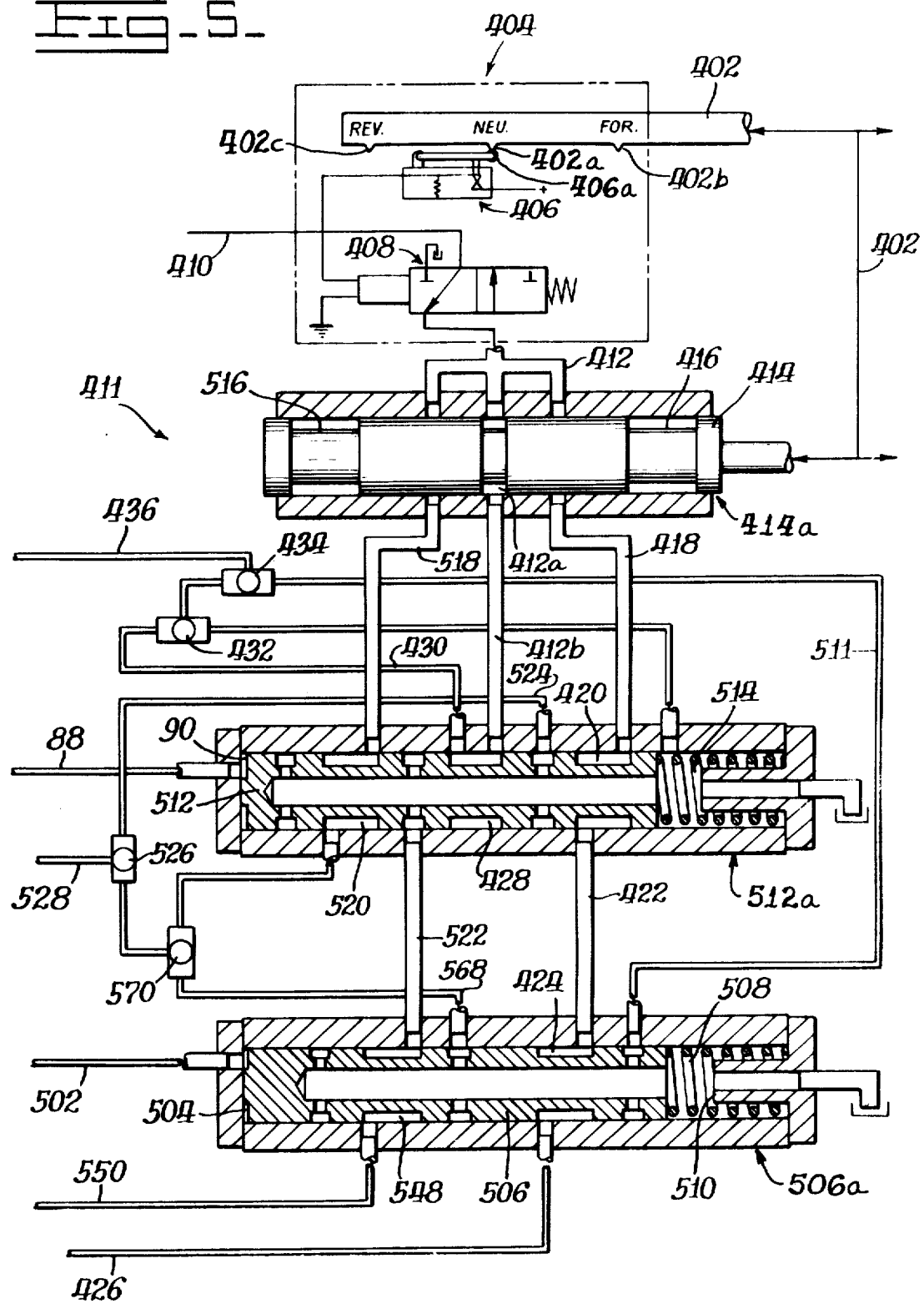
Fig_5_

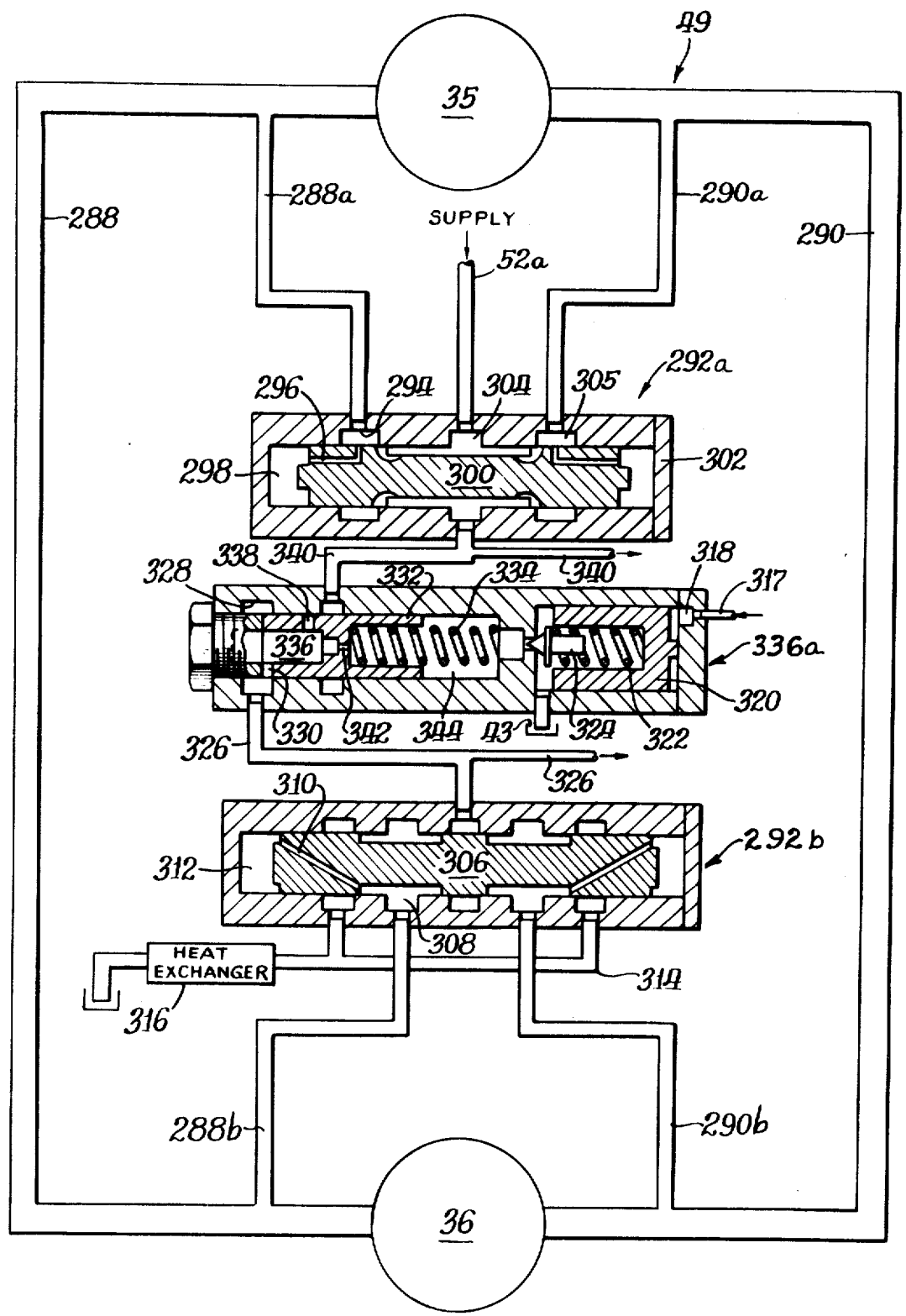

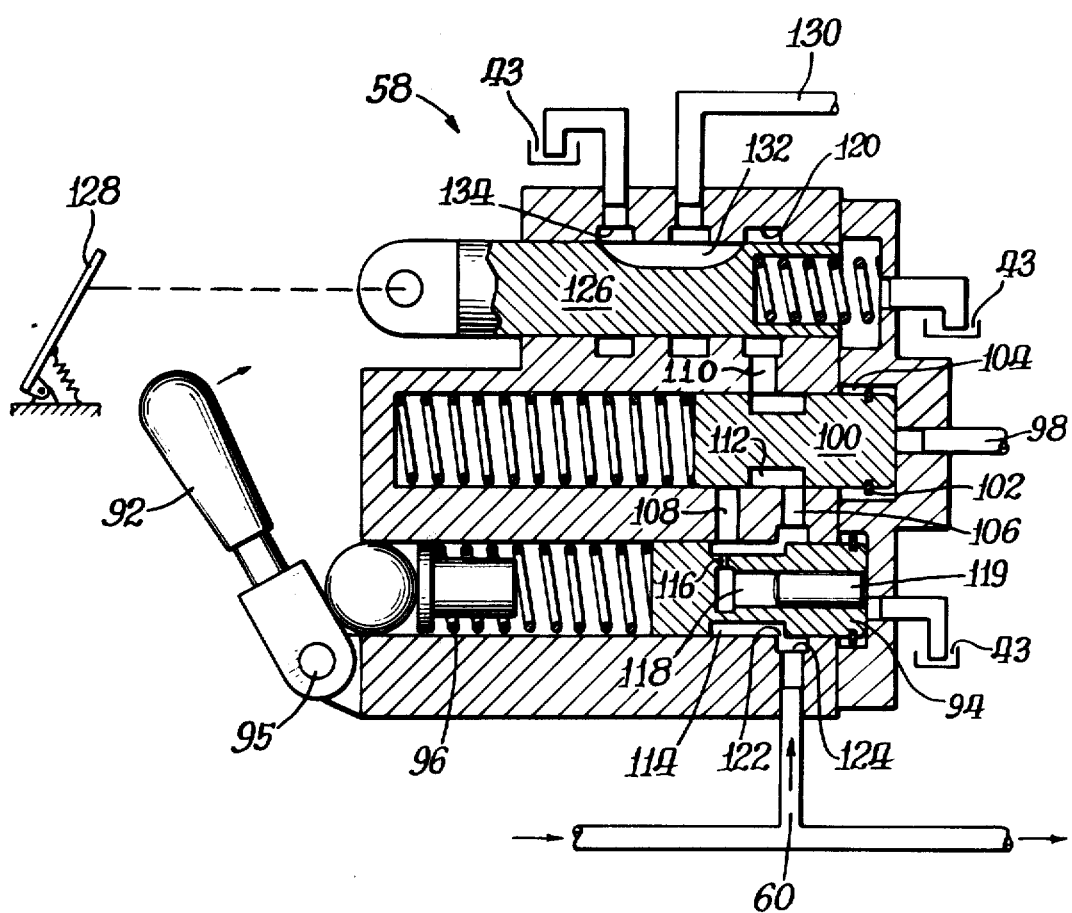

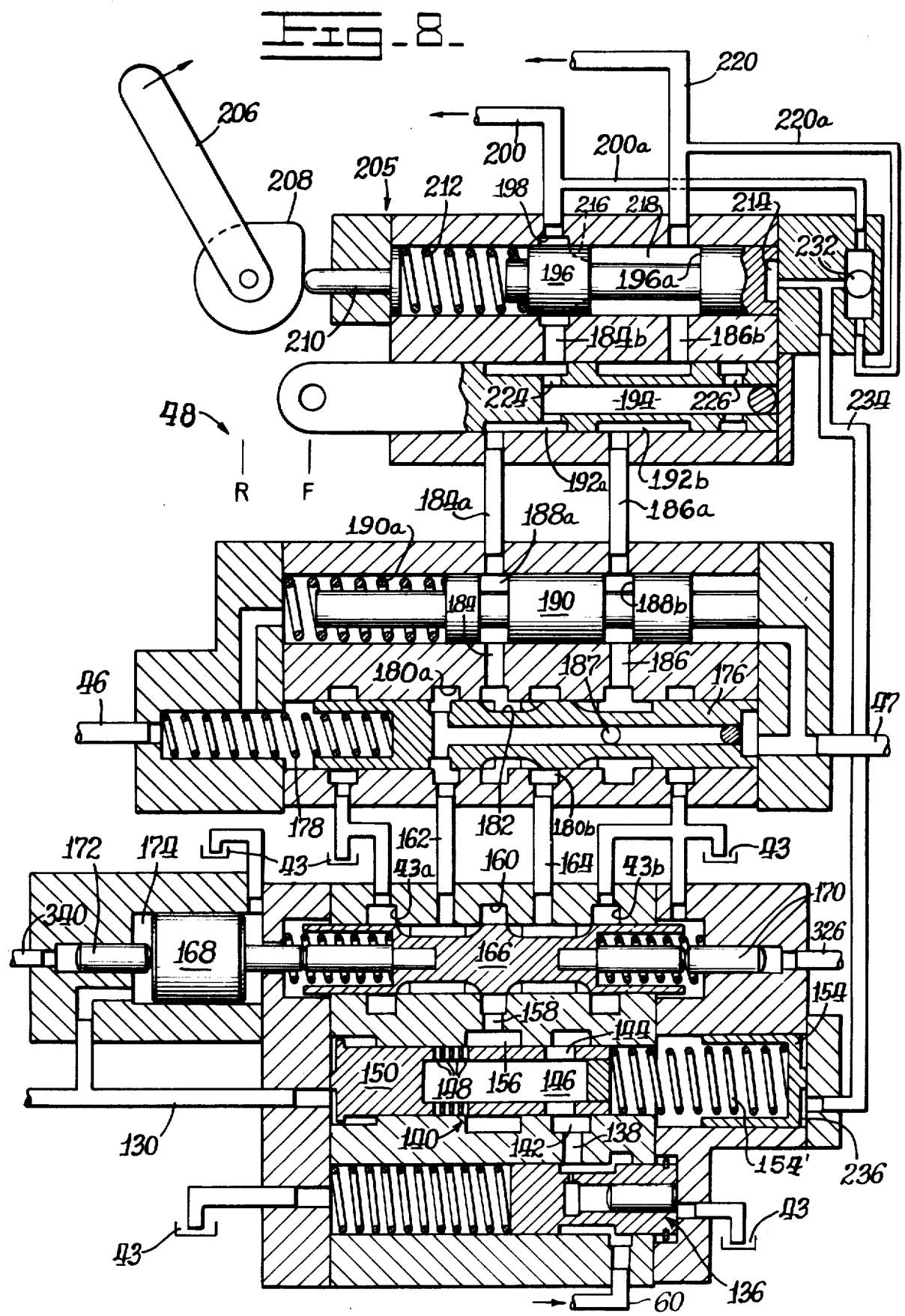

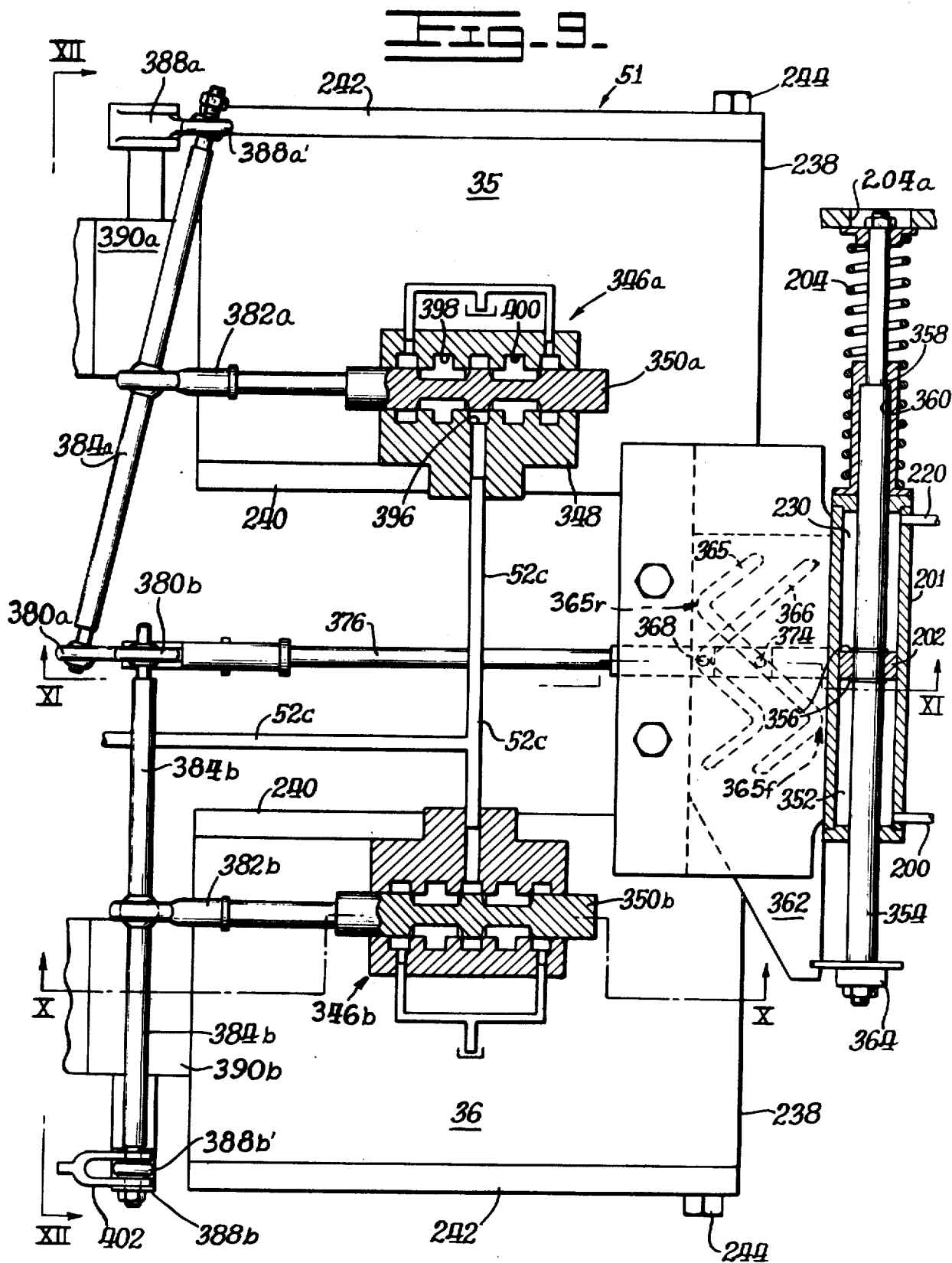

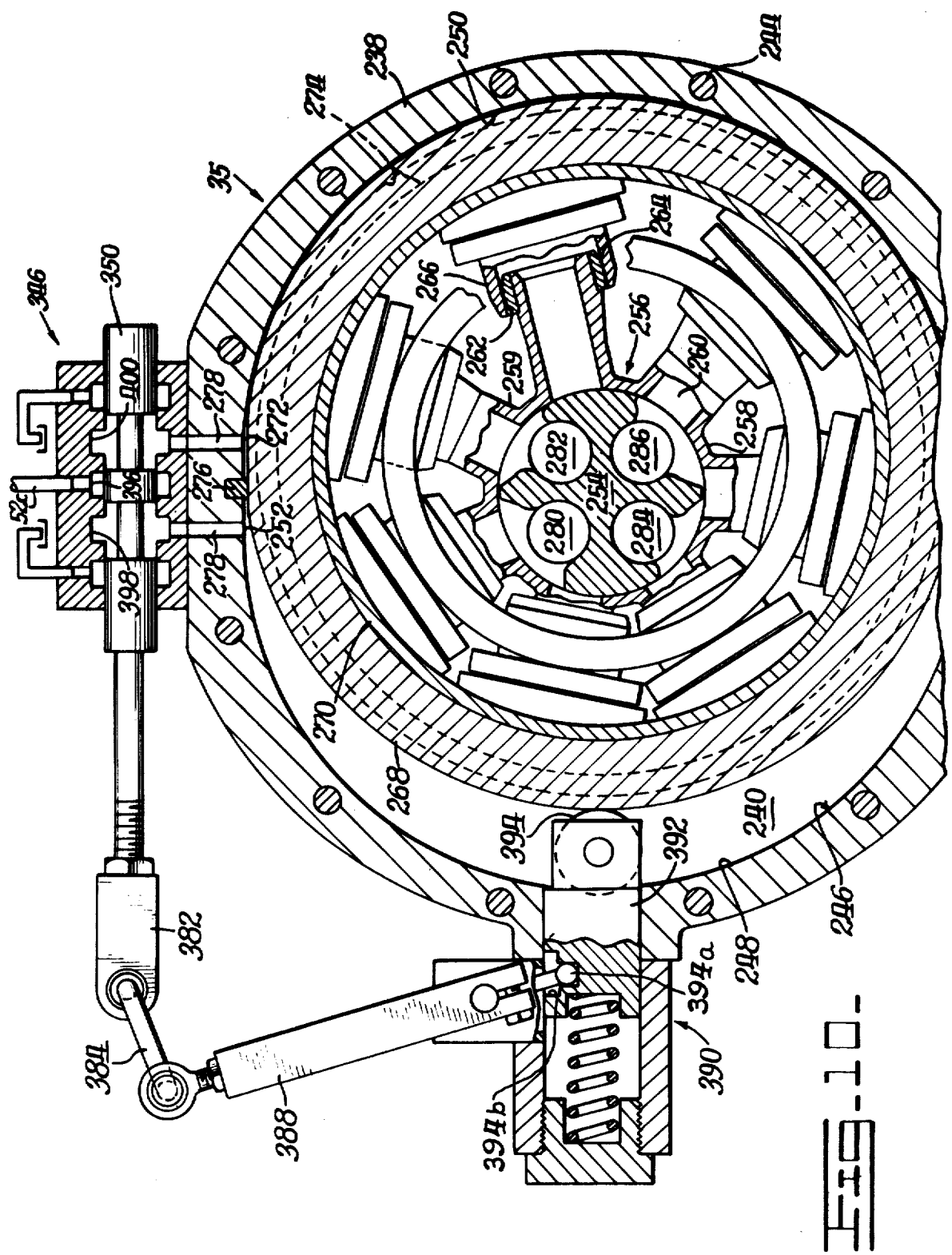

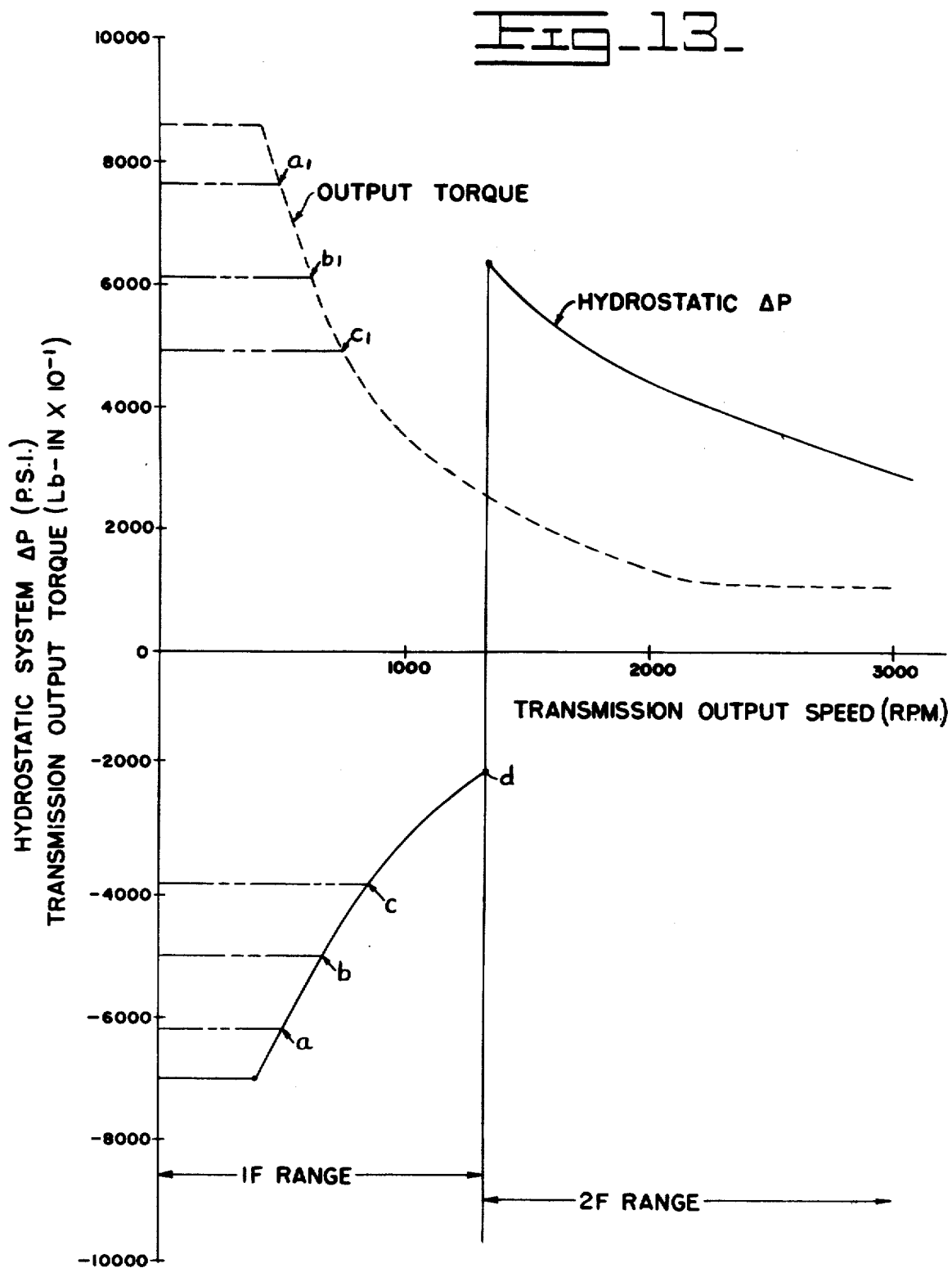

HYDRAULIC CONTROL SYSTEM FOR A HYDROSTATIC-MECHANICAL TRANSMISSION

CROSS-REFERENCE TO RELATED APPLICATION

This application is a continuation-in-part of Applicant's copending application Ser. No. 556,852 filed Mar. 10, 1975 and having the same title application Ser. No. 556,852 having been abandoned following filing of the present application.

BACKGROUND OF THE INVENTION

This invention relates to control systems for vehicle transmissions of the infinitely variable drive ratio hydromechanical form.

More particularly the invention provides for controlling the operation of a hydro-mechanical transmission having mechanical drive input and output sections with planetary gearing for establishing a plurality of fixed drive ratios in both forward and reverse and which also have a hydrostatic section including a pair of hydraulically coupled variable displacement fluid translating devices arranged to enable infinite variation of the drive ratio of the transmission throughout the plural forward and reverse mechanical speed ranges. By enabling infinite variation of drive ratio throughout an extremely broad range of ratios, a transmission of this kind enables selective control of vehicle ground speed and wheel torque by adjustment of the transmission itself while engine speed is maintained constant, usually at the particular engine speed at which power output per unit of fuel consumed is maximized.

A highly advantageous vehicle transmission of the general type discussed above is disclosed in detail in prior U.S. Pat. No. 3,897,697. To fully realize the advantages of such a transmission, a control system is needed which involves several control functions and implementing mechanisms having unique characteristics.

Unlike many older forms of vehicle drive systems, the operators accelerator pedal in a vehicle employing the above identified transmission does not control engine speed. Further, if the accelerator pedal were to be simply linked with the displacement adjustment of the transmission to vary drive ratio with pedal position in a straightforward manner some serious control problems would be encountered at least in certain types of vehicle. Such an arrangement would under certain conditions enable very precise control of ground speed with the accelerator pedal but this would be gained at the cost of ease of control of wheel torque. With the accelerator pedal at some given position dictating a specific drive ratio and with the engine governed to operate at a constant engine speed, any change of load or resistance to vehicle movement would be sensed by the governor which would then shift to increase or decrease engine output power and torque as necessary to maintain the constant engine speed. Wheel torque would then change accordingly although the operators accelerator pedal had not been moved. This imprecision of wheel torque control would be compounded in vehicles where the same engine powers other implements such as the bucket of an earthmoving loader. Changes of loading on those other implements also cause excursions of engine torque which could result in wheel torque fluctuations if transmission drive ratio remains constant.

Direct precise control of wheel torque is, as a practical matter, more important than direct precise control of ground speed under certain operating conditions and particularly in certain types of vehicle which may be frequently operated under those conditions. The primary concern of the vehicle operator during start-up and initial acceleration, while pushing or pulling a heavy load or while traveling on a soft or slick surface is to control wheel torque rather than ground speed as such. Too much wheel torque at such times results in a loss of traction and wheel spinning while too little wheel torque unnecessarily delays progress of the vehicle and detracts from job productivity in the case of earthmoving vehicles or the like.

Thus to ease the operators task and to gain precision in control of the vehicle, a control system for the above identified transmission should enable the accelerator pedal or the like to be used primarily as an output torque control rather than for directly regulating output speed as such or for controlling engine speed. Ease and precision of vehicle control could be still further enhanced if the range of output torques realizable between the extremes of travel of the accelerator were itself adjustable by the operator to accomodate to the different requirements of different ground conditions and loads. The operator could then set the system for very fine control within a narrow range of wheel torques or relatively coarse control within a broader range of torques to accommodate to different specific working conditions.

If the operator were provided with still another control, independent of the accelerator pedal, for selecting a maximum ground speed, still greater overall precision of vehicle control could be realized.

A control system for a transmission of the above-discussed kind should preferably have still additional capabilities. Variation of drive ratio is accomplished in part by changing displacements of fluid translating devices in the hydrostatic section of the transmission but when the limits of displacement change are reached it is necessary to upshift or downshift between fixed drive ratios in the mechanical sections of the transmission if infinite variation of the overall drive ratio of the transmission is to continue. To simplify the operator's task the control system should preferably accomplish this automatically.

Considering still another desirable capability for a control system of the kind discussed above, it has been pointed out that the objective of maintaining a constant engine speed can be accomplished primarily by utilizing a governed engine freed from any direct control by the operator's accelerator pedal. However, the ability of a governor to compensate for changes of load on an engine is subject to limits. Accordingly it is preferable that the control system include means for maintaining the constant engine speed in the presence of load increases greater than can be compensated for by the engine governor. Still further, it is advantageous if the control system automatically inhibits overly rapid vehicle deceleration upon sudden retraction or release of the accelerator pedal.

SUMMARY OF THE INVENTION

The present invention is directed to overcoming one or more of the problems as set forth above.

According to the present invention a control system for an infinitely variable hydro-mechanical transmission provides for partially manual and partially automatic control of drive ratio in a manner enabling precise selective variation of wheel torque with an accelerator pedal or the like while the vehicle engine operates at a constant engine speed.

In a preferred form of the control system, the vehicle operator is provided with a maximum ground speed selector, a wheel torque upper limit selector and an accelerator pedal or the like movable to modulate wheel torque between a minimum value, which may be zero, and the limit established by the setting of the upper limit selector. Control fluid from a pump driven by the engine is used to generate a fluid displacement signal which controls drive ratio adjustment means at the hydrostatic section of the transmission in accordance with the positioning of the operator's controls.

The displacement signal is limited to a value determined by the setting of the operator's maximum ground speed selector and is modulated within that limit by means which compare an actual output torque signal with a selected torque signal from the operator's controls and which automatically adjust the displacement signal when necessary to maintain correspondence between the two torque signals. Thus ground speed is automatically varied when necessary in order to maintain a manually selected wheel torque.

The above-described displacement signal modulating means may be overridable by automatic engine underspeed prevention means, preferably responsive to control fluid flow rate variations, which limits or decreases the displacement signal to the extent necessary to prevent engine lugging. Engine overspeed inhibiting means, also preferably responsive to control fluid flow variations, may also be present to prevent overly abrupt vehicle deceleration by limiting the rate of downshift displacement change. Still other automatic means are provided for upshifting and downshifting between mechanical speed ranges when the limits of displacement are reached in the hydrostatic section of the transmission.

The invention, together with further objects and advantages thereof, will be better understood by reference to the following description of a preferred embodiment taken in conjunction with the accompanying drawings.

BRIEF DESCRIPTION OF THE DRAWINGS

The invention will be better understood by reference to the drawings wherein like numbers denote like parts throughout and in which:

FIG. 1 is a schematic diagram of a hydro-mechanical power transmission which is controllable by the control system of the present invention, FIG. 2 is a schematic diagram of the major components of a transmission control system embodying the invention, FIG. 3 illustrates in chart form the engagement of specific clutches and brakes of the transmission of FIG. 1 at each forward and reverse speed range, FIG. 4 illustrates in a sectional view the mode control and clutch control valve group components of the system of FIG. 2 and related fluid passages, FIG. 5 is a sectional view of further components of the system of FIG. 2 for generating shift signals for the mechanical section of the transmission, FIG. 6 is a partially schematic and partially sectional view of the closed loop hydrostatic system components of the transmission and control system, FIG. 7 is a sectional view of components of the system of FIG. 2 for generating a selected wheel torque signal in response to movements of operator's torque controls.

FIG. 8 is a sectional view illustrating a suitable detailed construction for a displacement control valve group of the control system of FIG. 2, FIG. 9 illustrates displacement adjustment means for the transmission of FIGS. 1 and 2.

FIG. 10 is a cross-sectional view, with portions of internal elements broken out, of a radial piston fluid pump or motor fluid translating device of the transmission of FIG. 1 together with a servo valve and related control linkage enabling displacement adjustment by the control system of FIG. 2, FIG. 13 is a graphical depiction of transmission output speed as a function of wheel torque and of hydrostatic section pressure differential in the transmission of FIG. 1 when controlled by the system of FIG. 2.

DESCRIPTION OF A PREFERRED EMBODIMENT

Figure 11:
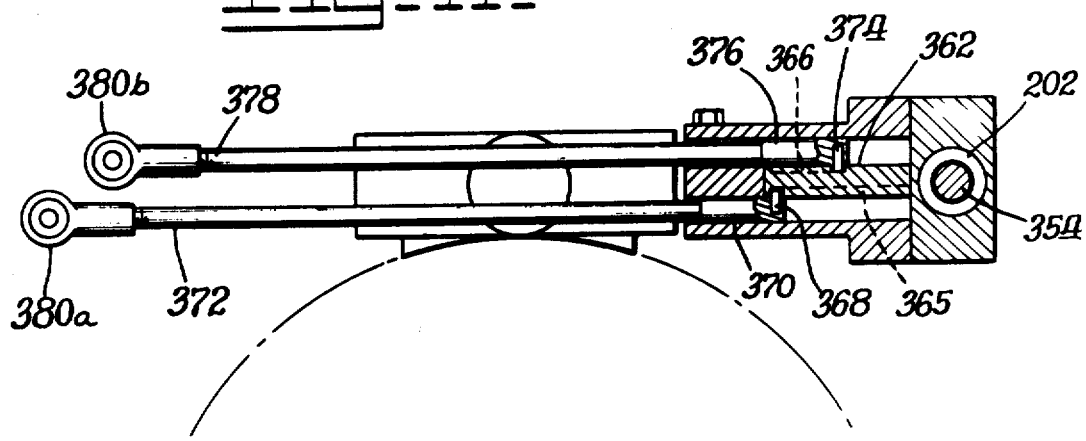
FIG. 11 illustrates in partial sectional view a portion of linkage mechanism for actuating the structure of FIG. 10, FIG. 12 in an end view of the linkage of FIG. 11.
Figure 12:
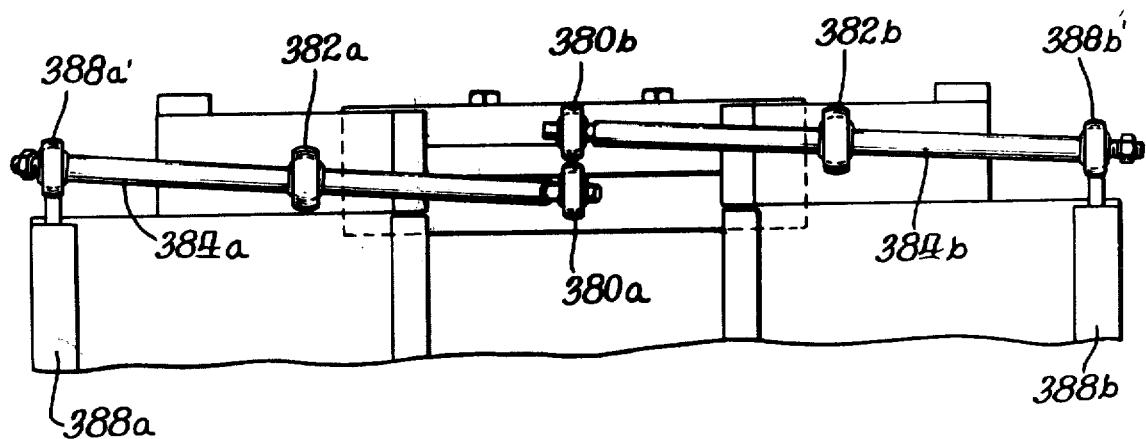

FIG. 1 illustrates an infinitely variable drive ration hydro-mechanical transmission 11 similar to that depicted and described in U.S. Pat. No. 3,897,697 which patent is herein incorporated by reference. As therein described in more detail, the transmission 11 has three principal sections including a drive input mechanical section 12 having planetary gearings 39 and 40, fluid pressure actuated brakes 538 and 560 and fluid pressure engaged clutch 15. Transmission 11 also has a hydrostatic section 13 with hydraulically coupled variable displacement fluid translating devices 35 and 36 and displacement adjustment means 51 and further has a drive output mechanical section 14 with planetary gearing 46a, fluid pressure engaged brake 16 and fluid pressure engaged clutch 484. Components of the input section 12 are disposed along a first rotational axis defined by an input section shaft assembly 17 and components of the output section 14 are disposed along a second parallel rotational axis defined by an output section shaft assembly 18. Components of the hydrostatic section 13 are disposed along a third parallel rotational axis defined by a hydraulic section shaft assembly 19. A transfer gear 20 at one end of the input section 12 and a transfer gear 21 at the same end of the output section 14 and a transfer gear 22 at the same end of the hydraulic section 13 each engage with a single idler gear 23. Another transfer gear 24 at the other end of the input section 12, another transfer gear 26 at the other end of the output section 14 and still another transfer gear 27 at the other end of the hydrostatic section 13 each engage with a different single idler gear 28. The parallel relationship of the three shaft assemblies 17, 18 and 19 allows the three shaft assemblies to be angularly spaced around the idler gears 23 and 28 as depicted in detail in FIGS. 2 and 3 of U.S. Pat. No. 3,897,697.

FIG. 2 illustrates major components of the transmission control system of the present invention and their interrelationship with the hydro-mechanical transmission of FIG. 1. Power or drive from an engine 30 is supplied to the transmission 11 through a coupling 31 and input shaft 32 of the input section 12. An output shaft 33 and output gear 34 of the output section 14 provide for delivery of drive to the wheels, tracks or other running gear of a vehicle. The input section 12 of the transmission provides for selective reversal of the rotation of the output gear 34 between forward and reverse drive directions while the output section 14 of the transmission provides for two different fixed drive ratios within the power path from idler gears 23 or 28 to output gear 34 enabling establishment of a low speed range and a high speed range in both forward and reverse drives. Within either speed range and either drive direction, the hydrostatic section 13 provides for selectively varying the drive ratio between the input shaft 32 and idler gear 23 or 28 in an infinitely variable manner. This enables continuous variation of the drive ratio of the transmission as a whole, from the low end of the low speed range to the top of the high speed range in both forward and reverse, as further discussed below. The driving engine 30 may then be continuously operated at a single preferred speed, typically the speed at which the power production per unit of fuel is maximized, while the transmission 11 is used to control the ground speed and wheel torque of a vehicle.

Referring again to FIG. 1, the rotor shaft 37 of a first of the two variable displacement fluid translating devices 35 of hydrostatic section 13 is coupled to transfer gear 22 while the rotor shaft 38 of the other fluid translating device 36 is coupled to transfer gear 27. The primary function of the hydrostatic section 13 is to couple the two idler gears 23 and 28 through means having an infinitely variable drive ratio so that each idler gear is constrained to rotate at a controllable speed relative to rotation of the other. As the idler gears are coupled to reaction members of the planetary gear sets 39 and 40, this enables progressive changing of the division of power flow through two parallel paths, each of which has a different drive ratio, that are ultimately combined into one output power path. This in turn enables the overall drive ratio between the input shaft 32 and the output gear 34 of the transmission to be continuously varied throughout the low drive range in either drive direction and then enables further continuous variation of the drive ratio after upshifting into the high drive range.

FIG. 3 indicates the clutch and brake engagements needed to condition the transmission for low and high speed ranges in both forward and reverse drive modes.

As the several drive conditioning clutches and brakes of the mechanical sections 11 and 14 of the transmission are fluid pressure actuated and as the displacement adjustment means of the hydrostatic section 13 may be fluid pressure responsive mechanism to be described, control of the transmission reduces to a matter of applying fluid pressures to these components at appropriate times. The control system 41 of the present invention, as depicted schematically in FIG. 2, is essentially a hydraulic system for generating the necessary fluid pressures in response to the positioning of operator's controls and in further response to automatic means which monitor certain engine and transmission operating parameters.

Referring now to FIG. 2, a pump 42 driven by the vehicle engine 30 delivers a hydraulic fluid such as lubricating oil from a sump 43 into a main supply conduit 44. Fluid then passes through a venturi 45 to provide a differential pressure for two signal lines 46 and 47 leading to a displacement control valve group 48. The fluid flow through the venturi 45 is proportional to engine speed and thus the pressure differential between signal lines 46 and 47 is indicative of engine speed. The pump 42 supplies pressurized control fluid to a closed loop hydraulic system 49, a mode selector valve 50 and a servo actuator system 51, via the conduits 52a, 52b, 52c, respectively, the functions of such components and suitable detailed structures for such components being hereinafter described.

The mode selector valve 50 has three positions, corresponding to forward, reverse and neutral, and is actuated by a hand lever 53. The mode selector valve 50 applies control fluid to a clutch and brake control valve group 54 via a conduit 56 and also supplies fluid to a selected torque signal generator valve group 58, via a conduit 60, at the forward and reverse settings of the mode selector valve but not at the neutral setting.

Referring now most particularly to FIG. 4, the mode control valve 50 may have a directional spool 62 slidably positioned in bore 64 in a housing 66 and having three axially spaced position grooves 68 which may be entered by detent balls 70 acted on by springs 72 to hold the valve spool at a selected position.

The directional spool 62 as illustrated in FIG. 4 is in the neutral position at which a spool land 74 blocks flow of control fluid through the mode control valve. When the spool 62 is shifted leftwardly into the forward or reverse mode position, a spool edge 75 closes a drain 76 and a spool edge 78 opens control fluid inlet annulus 80 to another annulus 82 so that fluid passes from conduit 52b into annulus 82 and on to a conduit 56 leading to the clutch and brake control valve group 54. This also directs control fluid to the torque signal generator valve group 58 (shown in detail in FIG. 7) and to a displacement control valve group 48 (shown in detail in FIG. 8) through another conduit 60 which also connects with annulus 82. It should also be noted that when spool 62 is moved to the extreme left (reverse mode) the spool edge 78 also admits fluid into a chamber 86 so that fluid passes from conduit 52b to a reverse signal line 88 and thence to a forward-reverse logic spool chamber 90 (shown in FIG. 5).

Thus the mode control valve 50 serves to supply pressurized control fluid to clutch and brake control valve group 54, and to torque signal generator valve group 58 and displacement control valve group 48 at both the forward and reverse setting of the mode control valve. Fluid pressure is additionally applied to line 88 at the reverse setting only. The supply of control fluid to each of these components is blocked at the neutral setting of the mode control valve 50 and each such component is vented to tank at that time. The structure and functions of each of these components which are selectively activated by manipulation of the mode control valve 50 will be hereinafter described.

Referring now to FIG. 7, suitable structure is shown for the selected torque signal generator valve group 58. The basic function of valve group 58 is to produce a selected torque signal in the form of a selectable fluid pressure within a torque signal line 130 that is determined by the positions of a primary torque limit selector lever 92 and an accelerator pedal 128. By adjusting lever 92 the operator chooses a maximum limit for the selected torque signal according to ground conditions, the anticipated loading on the vehicle and the general level of ground speed and acceleration rates which will be present during operation of the vehicle, the basic object being to avoid wheel slippage while not limiting wheel torque any more than is necessary for this purpose. Skilled operators of vehicles, such as earthmoving loaders for example, learn to make informed judgments concerning these conditions but have not heretofore had control systems which enable the same precision and ease of control of wheel torque. After presetting a selected maximum wheel torque by adjustment of lever 92, the operator may then further modulate the torque signal, by manipulation of accelerator pedal 128, from a minimum torque signal which may be zero up to the maximum determined by the setting of lever 92.

This control function is essentially a pressure compensation at the hydrostatic devices of the transmission which limits the rate of change of displacements during acceleration and which varies the displacements if the load on the driving engine varies when the vehicle is traveling at a relatively steady ground speed. The pressure differential between the flow conduits 288 and 290 which hydraulically couple the fluid-translating devices 35 and 36 (FIG. 1) of the transmission is a function of transmission output torque and thus of wheel torque. Referring again to FIG. 7, the operator by setting lever 92 dictates the maximum pressure level to which the hydrostatic differential pressure and therefore wheel torque can go. Thus, the operator can choose to limit maximum hydrostatic differential pressure to levels represented by lines a, b or c for example in FIG. 13. Since the purpose of this function is primarily to prevent wheel slip, which is not usually a problem while traveling at higher speeds, the torque signal generator valve group 58 further functions to inactivate the maximum limit when the transmission is shifted to high forward or high reverse speed range thereby allowing the hydrostatic differential pressure to go to a value corresponding to the maximum position of lever 92 without regard to the actual position of the lever. Provided that wheel torque is below the maximum limit dictated by the setting of lever 92, it is proportional to the position of the accelerator pedal 128 which the operator manipulates to selectively vary wheel torque and ground speed.

Considering now suitable structure for implementing the above-described functions, with reference again to FIG. 7, a clockwise movement of lever 92 about a pivot center 95 increases the load force which a spring 96 exerts against a reducing valve spool 94. When the transmission is in either forward or reverse low range, brake 16 of FIG. 4 is pressurized and by means of a line 98 from that brake, a pressure signal is transmitted to the right-hand end of an override valve spool 100 shown in FIG. 7. Spool 100 is then forced leftwardly against its spring until a snap ring 102 shoulders against a stop 104. In this position a passage 106 which receives control fluid from conduit 60 is blocked by spool 100 while another passage 108 is communicated with still another passage 110 through an undercut 112 on spool 100. Fluid then flows from conduit 60, around an undercut 114 on pressure-reducing spool 94 into passage 108 and then through an orifice 116 into a chamber 118 in spool 94 and against a slidable slug 119 creating a hydraulic force on spool 94 which acts against spring 96 and which is proportional to the pressure at the outlet passage 108 of the reducing valve. Increasing pressure in chamber 118 forces spool 94 to the left until an edge 122 thereof begins to restrict flow from the inlet annulus 124 to outlet passage 108. The pressure in outlet 108 then stabilizes at a value determined by the position of lever 92. Provided that spool 100 has been shifted to the left by the low range signal from line 98, this pressure is transmitted on to an annulus 120 of a variable orifice bridge valve spool 126 and varies between zero and the supply pressure in conduit 60 as determined by the amount of clockwise rotation of lever 92 from its most leftward position.

When the transmission is not in low range, signal pressure is absent from line 98. Override spool 100 remains to the right and full pressure from supply conduit 60 is transmitted to annulus 120 thereby removing the torque-limiting function of lever 92 from the system during the high speed range modes of operation.

Spool 126 is controlled by accelerator pedal 128 which allows the operator to vary the output torque of the transmission between zero and the particular maximum which has been selected by positioning of the hand lever 92. By depressing the accelerator pedal 128 the operator shifts spool 126 to transmit fluid from annulus 120 to selected torque signal line 130. The degree of communication of annulus 120 with line 130 increases as the pedal 128 is increasingly depressed and the same movement increasingly restricts communication of line 120 with a drain annulus 134. Thus by manipulating pedal 128 the operator may generate a selected torque signal in line 130 having a pressure magnitude anywhere from zero up to the maximum pressure limit established by the setting of lever 92.

In a typical example of the invention the pressure in annulus 120 may be limited to 100 psi (689000 Pa) when torque limit selector lever 92 is set for maximum torque. Pressure in the line 130 may then be varied between zero and 100 psi by the rightward movement of spool 126 as spool slot 132 increasingly opens into annulus 120 while increasingly blocking line 130 from drain annulus 134.

Torque signal line 130 communicates with the displacement control valve group 48 depicted in FIG. 8. The displacement control 48 receives pressurized control fluid from conduit 60 in both forward and reverse modes of operation as previously described and utilizes such fluid to generate a displacement control signal for the fluid translating devices 35 and 36 of FIG. 1 at the hydrostatic section 13 of the transmission.

Mechanisms which adjust displacements in response to the displacement control signal will be hereinafter described in detail but to facilitate an understanding of the displacement control valve group of FIG. 8, it will be pointed out at this time that the displacement adjustment means 51 at the hydrostatic section of the transmission is spring-biased towards a null torque position which establishes zero output speed and zero output torque. In other words, in the absence of a displacement signal, the system self-shifts to the low end of the low speed range. In the absence of fluid pressure in either of a forward drive displacement signal line 200 or a reverse drive signal line 220, shown in FIG. 8, displacements are at this null torque position and the vehicle is immobile. If a fluid pressure is then established in line 200, the displacements shift away from the null torque position in the forward drive direction by an amount proportional to the magnitude of such pressure thereby upshifting or decreasing the transmission drive ratio by a controlled amount. A drop of pressure in line 200 results in downshifting, i.e., a drive ratio increase, by an amount proportional to the pressure drop. Similar displacement and drive ratio changes are brought about in the reverse drive direction by fluid pressure changes in line 220.

Control of the drive ratio of the transmission is thus in part a matter of controlling fluid pressure in line 200 or line 220 depending on the direction of vehicle travel. The displacement control valve group 48 of FIG. 8 functions to control such fluid diaplacement signal pressures on line 200 or 220 in response to several different input signals. More specifically, the displacement control 48 functions to initiate a displacement signal in response to receipt of a selected torque signal on line 130 from the previously described torque signal generator valve group and then modulates the rate of change of the displacement signal to match that of the selected torque signal in order to limit vehicle acceleration to a rate consistent with the selected torque. The displacement control 48 terminates a rise of the displacement signal when wheel torque, as indicated by hydrostatic section fluid pressure differential received on signal lines 340 and 326, matches the selected torque signal on line 130. The displacement control group 48 then increases or decreases the displacement signal pressure, to upshift or downshift the transmission, when the selected torque signal is varied by the operator. This causes wheel torque to continue to correspond with what is called for by the operator except under certain conditions to be described. In the absence of those conditions, the operator's control of wheel torque amounts to control of ground speed. If the operator signals for increased wheel torque the displacement signal rises, upshifting the transmission. While this inherently decreases torque amplification within the transmission itself it also increases the load on the engine causing an inverse reaction. In particular, the engine governor senses the increased load and reacts by increasing the power and torque output of the engine in order to maintain engine speed. This increased torque input from the engine offsets the decreased torque amplification in the transmission itself and results in a net increase of wheel torque to match the ground speed increase dictated by the change of drive ratio.

In practice there is often not an exact correlation of wheel torque and ground speed as described above because of the effects of variable loading or resistance to vehicle movement. A loader vehicle, for example, is often driven into a pile of earth or other heavy material and the load on the engine increases abruptly at such times. As engine speed is maintained constant by the governor and ground speed is fixed by the existing drive ratio, the governor, in the absence of the present invention, would react by increasing engine torque and therefore wheel torque. Similar torque increases would occur during acceleration of the vehicle which is essentially another form of increased loading. Still other random torque excursions may tend to occur from variations of loading on other devices, such as a loader bucket, that are powered by the same engine. The displacement control 48 of the present control system further functions to prevent wheel torque increases of any of these kinds, beyond the limit being called for by the operator by automatically and temporarily downshifting the transmission to the extent necessary for this purpose. This reduces the load reaction on the engine, by reducing ground speed, while maintaining wheel torque at the value being called for by the operator. Thus the accelerator pedal is primarily a wheel torque selector and is only indirectly a ground speed control.

As ground speed may not always correlate exactly with the position of the operator's accelerator pedal for the reasons discussed above, vehicle control is further facilitated in that the displacement control functions still further to enable the operator to select a maximum ground speed by establishing a selected maximum pressure for the displacement signal.

The displacement control 48 provides two other automatic control functions. First, the ability of the engine governor to compensate for increased loading while maintaining constant engine speed is subject to a limit dictated by the maximum power output capabilities of the engine. When that limit is exceeded, the engine starts to lug which is a condition of decreasing engine speed due to overloading. Displacement control 48 detects incipient lugging, as signaled by a decrease of differential pressure between venturi signal lines 46 and 47, and automatically and temporarily downshifts the transmission to the extent necessary to relieve the engine overload. This action is independent of the torque-responsive control functions discussed above.

Second, in a vehicle in which ground speed is controlled by varying transmission drive ratio while engine speed is maintained constant, a sudden release of the accelerator pedal can cause an undesirably abrupt deceleration of the vehicle. Such a condition is accompanied by an increase in engine speed since momentarily the momentum of the vehicle reverses the normal power flow and the wheels are driving the engine. Displacement control 48 automatically prevents overly abrupt deceleration by sensing engine overspeed as signaled by venturi lines 46 and 47 and by then limiting the rate of any displacement signal change which may be in progress during the overspeed condition.

Considering now a suitable detailed structure for the displacement control 48 to implement the several functions discussed above, control fluid from supply conduit 60 initially flows through a pressure-reducing valve 136 of the form which maintains a predetermined fixed pressure in an outlet passage 138 which pressure may be 100 psi in a typical example. Passage 138 transmits the fixed pressure fluid through an annulus 142 to an opening 144 and chamber 146 within a flow rate control valve spool 150. Spool 150 is biased leftwardly as viewed in FIG. 8 by a spring 154' and the force of the spring may be varied by fluid pressure variations in a chamber 236 which act against a load piston 154. Spool 150 has a series of axially spaced ports 148 which increasingly communicate chamber 146 with a flow passage 148 as the spool is shifted rightwardly against the force of spring 154'.

Thus the rate at which displacement signal fluid can flow is regulated by the position of spool 150. This enables control of the rate of rise of the displacement signal and thereby enables limiting of vehicle acceleration to a rate consistent with the wheel torque limit selected by the operator. To cause spool 150 to shift as necessary for this purpose, the selected torque signal fluid pressure from line 130 is communicated with the left end of the spool. A shuttle valve 232 has first and second inlets 200a and 220a communicated with displacement signal lines 200 and 220 respectively and an outlet 234 communicated with the chamber 236 behind load piston 154 thereby opposing the rightward pressure on spool 150 with a counter force proportional to the displacement signal pressure. Thus the rate at which displacement signal pressure can rise in response to a rise of the selected torque signal is caused to be an inverse function of the absolute value of the then existing drive ratio of the transmission.

From passage 158 the fluid passes to an annulus 160 encircling a torque-limiting valve spool 166 which is spring-centered to a position at which a central land on the spool blocks annulus 160. Rightward movement of spool 166 meters fluid from annulus 160 to an upshift signal passage 162 while venting a downshift signal passage 164 to drain. Leftward movement of the spool 166 meters the fluid to the downshift passage 164 while venting the upshift passage 162 to drain.

Actual output torque signal lines 326 and 340 transmit opposing fluid pressures to slugs 170 and 172 which are situated at the right and left sides respectively of spool 166 and which exert opposing forces thereon. Slug 172 in particular acts on the spool 166 through a piston 168, the function of which will be hereinafter discussed. Through mechanism to be hereinafter described in more detail, line 326 receives fluid pressure from the one of the hydrostatic section flow paths 288 and 290 of FIG. 6 which is most highly pressurized at any given time, while line 340 receives a fluid pressure corresponding to that in the other of the flow paths. Returning to FIG. 8, this creates a net leftward force on spool 166 proportional to the pressure differential in the hydrostatic section of the transmission and therefore proportional to the actual wheel torque of the vehicle at the time. If not counteracted, this net force shifts spool 166 to admit fluid to downshift passage 164, while venting upshift passage 162, thereby shifting the hydrostatic section of the transmission all the way down to the null torque position at which the vehicle is immobile. Spool 166 centers at that time, as the pressures in lines 326 and 340 become equal, blocking a continued displacement change into the opposite drive direction range of displacements.

To enable controlled acceleration of the vehicle in response to accelerator pedal depression, selected torque signal pressure line 130 is communicated with chamber 174 to cause the pressure to act on piston 168 and thereby shift spool 166 rightwardly until such time as the hydrostatic section differential pressure acting leftwardly on the spool rises to balance out the selected torque signal pressure.

Accordingly, when the selected torque signal pressure against piston 168 rises in response to depression of the accelerator pedal, spool 166 moves rightwardly to admit fluid to upshift passage 162. Wheel torque and ground speed increase until the resulting increase in differential pressure between lines 326 and 340 rises to match the increased selected torque signal. At that point spool 166 centers and terminates the rise of the displacement signal pressure and of wheel torque. An opposite movement of spool 166 and a decrease of the displacement signal pressure follows a decrease of selected torque signal pressure from retraction of the accelerator pedal. The leftward spool movement releases fluid from upshift passage 162 to a drain annulus 43a while isolating the downshift passage 164 from the opposite drain annulus 43b and then directing fluid to the downshift passage. Spool 166 again centers to end the displacement signal change when wheel torque, as represented by the differential pressure between lines 326 and 340, reduces to match the lowered selected torque signal pressure.

Spool 166 also shifts rightwardly or leftwardly as necessary to prevent deviations of wheel torque, from the value represented by the selected torque signal, which would otherwise occur from the actions of the engine governor in response to load variations as previously discussed. Such wheel torque excursions change the pressure differential between lines 326 and 340 temporarily unbalancing the forces on spool 166 which then shifts to transmit fluid to upshift passage 162 or downshift passage 164 while releasing fluid from the other thereof until wheel torque restabilizes at the selected value.

Upshift and downshift passages 162 and 164 communicate with axially spaced apart annuli 180a and 180b respectively which encircle an underspeed valve spool 176. Spool 176 is biased rightwardly as viewed in FIG. 8 by a spring 178 while being urged in the opposite direction by a fluid pressure force proportional to engine speed as the pressure from the previously described venturi signal lines 46 and 47 is transmitted to opposite ends of the spool. The fluid pressure force overcomes that of the spring 178 when the engine is operating at the normal predetermined constant engine speed and spool 176 is therefore normally held in the leftward position. At that position, the spool 176 communicates upshift passage 162 and downshift passage 164 with additional passages 184 and 186 respectively. If engine speed decreases from overloading spring 178 shifts spool 176 rightward thereby reversing these fluid flow connections and causing a downshift of the transmission to the extent necessary to maintain the predetermined constant engine speed.

Passages 184 and 186 lead to an engine overspeed valve spool 190 which is biased rightwardly as viewed in FIG. 8 by a spring 190a. At the rightward position grooves 188a and 188b on spool 190 communicate passages 184 and 186 with continuing passages 184a and 186a respectively. Venturi signal lines 46 and 47 communicate with the left and right ends respectively of spool 190 causing a fluid pressure force, proportional to engine speed, to act on the spool in opposition to the force of spring 190a. If engine speed begins to exceed the predetermined constant engine speed, the fluid pressure shifts spool 190 leftwardly blocking communication between passages 184 and 186 and passages 184a and 186a respectively thereby blocking any decrease of displacement signal that may be in progress until engine speed returns to the predetermined constant value. The engine overspeed condition may tend to occur upon sudden release of the accelerator pedal and the primary function of the overspeed valve spool 190 is to prevent engine overspeed which could result from overly rapid downshifting of the transmission.

Passages 184a and 186b lead to a forward-reverse mode control valve spool 194 which is shifted to the right as viewed in FIG. 8 by the mode control hand lever 53 of FIG. 2 when the hand lever is at the forward drive setting. Referring again to FIG. 8, at the forward drive position grooves 192a and 192b of spool 194 communicate passages 184a and 186a with continuing passages 184b and 186b respectively. With spool 194 shifted leftwardly to the reverse drive position, openings 224 and 226 in the spool cause a reversal of these fluid connections with passage 184a then being communicated with passage 186b while passage 186a is then communicated with passage 184b.

Passage 184b is communicated with forward drive displacement signal line 200 through an annulus 198 which encircles a maximum ground speed selector valve spool 196. Passage 186b communicates with reverse drive displacement signal line 220 through a groove 196a on spool 196.

Spool 196 is a component of a maximum ground speed control 205 and functions to establish a selectable maximum fluid pressure in displacement signal line 200 in forward drive or line 220 in reverse drive as determined by the position of an operators maximum ground speed selector lever 206. Rightward pivoting movement of lever 206 as viewed in FIG. 8 acts through a cam 208 and cam follower 210 to selectively increase the rightwardly directed force which a spring 212 exerts on spool 196. The spring force on spool 196 is opposed by a feedback fluid force from line 200 or 220, depending on whether mode selector valve spool is in the forward or reverse drive position, received at an end chamber 214 of the spool from the outlet line 234 of the previously described shuttle valve 232.

Metering slots 216 in spool 196 are positioned to isolate lines 200 and 220 when the spool is at the extreme rightward position and to increasingly communicate the two lines as the spool is shifted progressively further to the left. Valve 205 thus functions as an adjustable pressure limiting device for the displacement signal lines 200 and 220. If, in the forward drive mode of operation, the fluid feedback pressure force in chamber 214 should rise slightly above the counter force exerted on spool 196 by spring 212, spool 196 moves leftwardly to release fluid from the pressurized displacement signal line 200 through metering slots 216 until the feedback pressure is again in balance with the spring force. An essentially similar metered release of fluid from line 220, through the metering slots 216, occurs in the reverse drive mode of operation to limit the magnitude of the displacement signal to a value determined by the position of lever 206.

Suitable displacement adjustment means 51 for adjusting the drive ratio of the transmission in accordance with the above described fluid displacement signals are depicted in FIGS. 9 to 12. The variable displacement fluid translating devices 35 and 36 which constitute the hydrostatic section of the transmission may each be of similar construction, a suitable example of which is depicted in FIG. 10. These mechanisms are termed fluid translating devices since each functions as a fluid pump at certain stages of operation while functioning as a fluid motor at other stages. Device 35 may have an annular outer housing 238 including an integral end member 240 at one end while being closed at an opposite end by an end plate 242 secured to the housing 238 by bolts 244. Housing 238 and end plate 242 define a chamber 246 which has semi-circular portions 248 and 250 at opposite sides connected by a short straight section 252. A rotor support 254 is secured to the center of housing end member 240 and extends axially into chamber 246.

A rotor 256 of the device 35 has an inner annular hub portion 258 which fits coaxially on the inner end of rotor support 254 within chamber 246 for rotation thereon. The rotor 256 is provided with a plurality of radially directed spokes 259, each of which has a central passage 260 extending therethrough. Each such spoke 259 is further provided with a piston ring 262 secured coaxially to the radially outmost end of the spoke 259, the piston rings 262 each having a convex outer surface 264 which enables each cylinder 266 to tilt relative to the associated spoke 259.

An annular outer race member 268 and a center inner race member 270 is disposed in chamber 246 in position to encircle the rotor 256. The inner surfaces of race members 268 and 270 are circular. The outer surface of race member 268 has a curvature conforming to that of the circular portions 248 and 250 of chamber 246 but has a flattened portion 272 at the center thereof.

In operation the race members 268 and 270 can be shifted diametrically within chamber 246 between ends 248 and 250 of the chamber. Circular seals 274 are disposed between outer race 268 and housing end member 240 and end plate 242. Sealing means 276 are disposed between such circular seals 274 and the adjacent straight section 252 and flat surface 272 of housing 238 and outer race 268 to extend along a plane which includes the rotational axis of rotor 256 and which bisects the straight section 252. One of a pair of bores 278 extends through housing 238 at each side of the seal means 276. Therefore, the outer race 268 can be shifted and then held at a selected position by forcing high pressure fluid into one of the bores 278 while venting the other bore 278.

The outer race 268 is shown shifted to one end of the chamber 246 in FIG. 10, the outer race 268 being eccentric relative to the axis of rotation of the rotor 256. Under this condition each cylinder 266 reciprocates relative to the associated rotor spoke 259 as the rotor revolves and the device 35 is at maximum displacement. To provide for the emission and release of fluid from the cylinders 266 through the spokes 259, four passages 280, 282, 284 and 286 extend within rotor support 254. Passages 284 and 286 both communicate with a first conduit 288, as shown in FIG. 6, at the exterior surface of rotor support 254 while passages 280 and 282 both communicate with a second conduit 290.

As may be seen in FIG. 6, conduits 288 and 290 hydraulically couple the fluid translating devices 35 and 36 and such elements, together with replenishing valves 292a and 292b and overpressure relief valve 336a, constitute the closed loop system 49 of the hydrostatic section of the transmission.

The closed loop system 49 receives fluid from supply conduit 52a at an annulus 304 of the first replenishing valve 292a which functions as a shuttle valve to direct such fluid to the one of conduits 288 and 290 that is the low pressure side of the closed loop at that time. For example, should conduit 288 be a high pressure side then conduit 290 is a low pressure side. High pressure fluid then passes through line 288a into an annulus 294 and through a pilot passage 296 in spool 300 to a chamber 298 causing the spool 300 to move rightwardly against an end plate 302. With shuttle spool 300 moved rightwardly by the high pressure in line 288, the closed loop system 49 is replenished by fluid flowing from supply line 52a into annulus 304 and then to conduit 290 through another annulus 305 and a line 290a. Simultaneously another shuttle spool 306 of valve 292b receives high pressure fluid through a line 288b and annulus 308. Such fluid is transmitted through a pilot passage 310 into a chamber 312 causing spool 306 to move rightwardly and to connect the lower pressure closed loop conduit 290 to a drain passage 314 through a line 290b. Passage 314 returns the fluid to tank through a heat exchanger 316 which cools the circulating fluid. When conduit 290 is the high pressure side of the closed loop, replenishing valve spools 300 and 306 shift in opposite directions to circulate fluid in a similar manner through the low pressure side which is then defined by conduit 288.

Shuttle valve spool 300 also functions to transmit the fluid pressure from the low pressure side of the closed loop system 49 to the previously described output torque signal line 340 while shuttle valve spool 306 transmits fluid pressure from the high pressure side to the other output torque signal line 326.

Whenever the mode control valve 50 of FIG. 4 is shifted to the forward or reverse positions, control fluid passes across spool 62 and through conduits 56 and 317 into a chamber 318 of the overpressure relief valve 336a of FIG. 6 to act against a load piston 320. The pressure in chamber 318 causes load piston 320 to move leftward against a spring 322. This creates a spring load on a poppet valve 324. Assuming that conduit 288 is the high pressure side of the closed loop at the moment, fluid then passes through passage 288b, chamber 308, and through a conduit 326 into a chamber 328. This causes fluid to pass through slots 330 into a chamber 336 in a spool 332 which then moves rightwardly against a spring 334. As the spool 332 moves rightwardly an orifice 338 in the spool eventually opens to annulus 304 of valve 292a through line 340 thereby establishing an upper limit for the pressure differential between the two sides of the closed loop system. As fluid from chamber 336 also passes through an orifice 342 in spool 332 into the spring chamber 344, to act against poppet valve 324, valve 336a also establishes an absolute upper limit for fluid pressure in the closed loop system.

Referring now to FIG. 9, one of a pair of servo actuator valves 346 is mounted on each fluid translating device 35 and 36 and receives fluid from supply line 52c at an annulus 396 in the valve housing 348. As best seen in FIG. 10 each servo valve 346 has a spool 350 which may be shifted to adjust the displacement of the associated fluid translating device 35 by directing the pressurized fluid to one of the chamber sections 248 or 250 while releasing fluid from the other thereof to shift race 268 laterally relative to the axis of rotation of rotor 256.

Referring again to FIG. 9, the servo valves 346 are operated by actuator means responsive to the previously described fluid displacement signal and which in this example includes an actuator cylinder 201 having a movable rod 354 disposed along the axis of the cylinder. A piston 202 is mounted on rod 354 within cylinder 201 and divides the interior of the cylinder into two chambers 352 and 230. One end of rod 354 extends through a centering spring 204 which has one end abutted against a stationary element 204a and another end abutted against a flanged slidable sleeve 260 disposed coaxially on the rod adjacent cylinder 201 and in turn abutted against a shoulder 358 on the rod. Centering spring 204 thus urges piston 202 towards a centered position in cylinder 201 and resists movement of the piston away from the centered position, in either direction, with a force which increases as a function of the extent of such movement.

The forward drive displacement signal line 200 is communicated with interior chamber 352 of actuator cylinder 201 and the reverse drive displacement signal line 220 is communicated with chamber 230. Accordingly rod 354 shifts upwardly as viewed in FIG. 9 by an amount proportional to the magnitude of a fluid pressure on line 200 and shifts downwardly by an amount proportional to a fluid pressure on line 220. Such movements of rod 354 shift a slidable cam plate 362 which is coupled to the rod through a collar 364 carried thereon.

Referring now to FIGS. 9 and 11 in conjunction, cam plate 362 has a first angled groove 365 on the under surface and a second angled groove 366 on the upper surface. Pins 368 and 374 carried on axially translatable links 372 and 376 respectively extend into grooves 365 and 366 respectively. Referring again to FIG. 9 in particular, the above-described sliding movements of cam plate 362 thus cause axial movements of links 372 and 376 that are determined by the configurations of grooves 365 and 366. The groove configurations are such that when piston 202 is at the centered position in cylinder 201 (displacement signal pressures are absent from both signal lines 200 and 220), one of the fluid translating devices 36 is at zero displacement while the other device 35 is at one extreme of the displacement range. Downward movement of cam plate 362 as viewed in FIG. 9 first progressively increases the displacement of device 36 to maximum while progressively reducing the displacement of device 35 to zero. Continued movement of the cam plate in the same direction then progressively returns the displacement of device 36 towards zero while shifting device 35 over center towards the opposite displacement extreme. Upward movement of the cam plate 362, as viewed in FIG. 9, from the centered position first progressively increases the displacement of device 36 towards the opposite displacement extreme while progressively reducing the displacement of device 35 to zero. Continued movement in the same direction then progressively returns device 36 towards zero displacement while returning device 35 back towards the maximum displacement position.

Axial movement of link 376 is translated into axial movement of the spool 350b of the servo valve 346b at device 36 through a cross link 384b. In particular, one end of cross link 384b is coupled to link 376 at a ball joint 380b while the other end of the cross link is coupled to a follow-up lever 388b at another ball joint 388b'. An extension 382b of valve spool 350b couples to the midpoint of cross link 384b at still another ball joint 382b. Thus movement of link 376 pivots the cross link 384b thereby shifting valve spool 350b to open the servo valve 346b and thereby change the displacement of device 36 in the manner previously described.

The function of the follow-up lever 388b is to immediately reclose the servo valve 346b when movement of link 376 stops. In the absence of a follow-up action, any opening of the servo valve would eventually drive the device 36 to the maximum displacement position whereas it is desired that the displacement correspond, at any given time, with the axial position of link 376. As best seen in FIG. 10, the follow-up lever 388 is pivoted to a follow-up housing 390 at device 36. A slidable member 392 within the housing 390 is spring-biased towards outer race member 268 and carries a roller which rides against the race member. An end 394a of lever 388b extends into a seat 394b in member 392 in order to pivot the lever when a displacement change is occurring. Referring again to FIG. 9, it may be seen that such pivoting movement of the follow-up lever 388b continually attempts to recenter the spool 350b of servo valve 346b to stop the displacement change and will succeed in doing so when the counter movement of link 376 stops.

Axial movement of the other link 372 adjusts the displacement of the other fluid translating device 35 in a similar manner through another cross link 384a with ball joints 380a, 388a', 382a and follow-up lever 388a and follow-up mechanism 390a, all of which may be essentially similar to the corresponding elements at device 36 as described above.

At approximately the midpoint of movement of cam plate 362 from the centered position to the extreme position in either of the forward and reverse directions, it is necessary to upshift the mechanical sections of the transmission from low range to high range by engaging and disengaging fluid pressure actuated clutches and brakes in accordance with FIG. 3. Referring again to FIG. 9, it is also necessary to downshift the mechanical transmission sections back to low range at a corresponding point in the return travel of the cam plate. The shift point during forward drive is that at which fluid translating device 36 reaches the displacement extreme corresponding to angled portion 365f of cam plate groove 365. The shift point during reverse is the opposite displacement extreme corresponding to angled portion 365r of the groove. These shift points correspond to the extremes of movement of follow-up lever 388b. To signal the shift points to shift sequencing means to be hereinafter described, a rod 402 is coupled to the follow-up lever 388b at ball joint 388b'. Suitable detailed constructions for the clutch and brake control group 54 and shift sequencer 411 are shown in FIGS. 4 and 5 respectively.

Referring initially to FIG. 5, the above described shift point signaling rod 402 actuates an electrical switch 406 which controls a solenoid valve 408 to pressurize a shift signal line 412 at the two extremes of movement of the rod 402 and also at a point midway therebetween which is the neutral or zero output speed point in the range of displacement changes.

For this purpose, solenoid valve 408 is spring biased to a position at which shift signal line 412 is vented to tank and at which a fluid supply line 410 is blocked. The fluid supply line 410 receives fluid from supply conduit 52b of FIG. 4 through the outlet conduit 56 of mode selector valve 50 when the mode selector valve is at either the forward or reverse setting. Returning to FIG. 5, electrical energization of solenoid valve 408 shifts the valve to transmit such fluid from line 410 to the shift signal line 412. Switch 406 is connected in series with the solenoid valve 408 and a suitable electrical power supply and is of the normally open type. Shift point signaling rod 402 extends adjacent the switch actuator 406a and carries three protusions 402 positioned to depress the actuator and close the switch when the rod is at the range shift point positions in forward and reverse drive and when the rod is at the neutral position.

Shift point signaling rod 402 is also coupled to the spool 414 of a shift signal routing valve 414a which functions to direct the shift point signal fluid pressure from line 412 to a first outlet line 412b at the neutral position of rod 402, to a second outlet line 418 at the low forward/high forward shift point and to a third outlet line 518 at the low reverse/high reverse shift point, the spool having grooves 412a, 416 and 516 for this purpose. At other than the neutral position and speed range shift positions of rod 402, spool 414 isolates line 412 from each of the outlet lines 412a, 418 and 518.

Speed range shift initiating pressure signals on lines 412, 418 and 518 are transmitted to shift sequencer valve group 411 which in turn transmits such signals on to the clutch and brake control valve group 54 of FIG. 4. As it facilitates an understanding of the combined valve groups 411 and 54, valve group 54 in particular will be described first.

Referring now to FIG. 4, the valve group 54 includes four speed range spool valves including a high forward valve 468a, a low forward valve 438a, a low reverse valve 466a and a high reverse valve 546a, each of which may be set to pressurize and engage a unique combination of the clutches and/or brakes 484, 15, 16, 538 and 560 to establish a specific one of the four speed ranges in accordance with the data of FIG. 3. Referring again to FIG. 4, each of the speed range valves 468a, 438a, 466a and 546a is set by receipt of a fluid pressure set signal, which may be of brief duration, on an associated one of four set signal lines 426, 436, 528 and 550 respectively. Each speed range valve 468a, 438a, 466a and 546a holds itself in the set condition after termination of the set signal until a fluid pressure reset signal is received at the associated one of another series of signal lines 456, 492, 462a and 540a respectively. The four speed range valves 468a, 438a, 466a and 546a thus function essentially in the manner of fluidic flip-flops or bistable multivibrators as employed in fluid logic circuits.

Considering the high forward valve 468a in particular, for example, pressurized fluid is received at an annulus 474 through conduit 56 at the forward setting of the mode control valve 50. An outlet annulus 478 and outlet line 480 of the valve 468a communicates with clutch 484 through a three way check valve 482 and also with clutch 15 through another three way check valve 448. At the reset condition of the valve 468a, a spring 472 holds the spool 468 rightwardly as viewed in FIG. 4 and at this position outlet annulus 478 is isolated from inlet annulus 474 while being communicated with a drain annulus 476a through a spool groove 476.

A pressurized fluid set signal received at line 426 acts against spool 468 in opposition to the spring force to shift the spool to the left as viewed in FIG. 4. At this leftward or set position, spool groove 476 transmits fluid from inlet annulus 474 to outlet annulus 478 thereby pressurizing clutches 484 and 15 and establishing the high forward speed range in the transmission. Valve 468a remains at this set position, after termination of the set signal pressure in line 426, since the pressurized fluid from inlet annulus 474 is now also transmitted to an interior spool chamber 476c where it acts against a reaction slug 476b to hold the spool leftwardly. The spool is released for spring force return to the rightward reset position when a pressurized fluid reset signal is received on reset signal line 456. Through an annulus 470a such reset pressure enters another spool chamber 470 and acts against another reaction slug 470b to cancel out the opposing fluid pressure force in spool chamber 476c. Spool 468 also returns to the rightward or reset position, by spring force, when the fluid pressure at inlet annulus 474 is relieved by shifting of the mode control valve 50 to the neutral setting.

Each of the other speed range valves 438a, 468a and 546a may have an internal construction and mode of operation similar to that of valve 468a as described above although each such valve has different external connections as will now be described.

Referring now to FIG. 5 in conjunction with FIG. 4, the primary function of the shift sequencer valve group 411 is to transmit a set signal to the appropriate one of the speed range valves when the movements of rod 402 indicate a shift point has been reached.

Under the conditions depicted in FIGS. 4 and 5, the transmission is in neutral as mode control valve 50 is at the neutral setting at which the fluid supply conduit 56 is unpressurized and all clutches and brakes 484, 15, 16, 538 and 560 are unpressurized and unengaged. If the mode control valve 50 is then shifted to the forward drive setting, pressurized fluid passes through conduit 56 and line 410 to the solenoid valve 408 of FIG. 5. Provided that the operators accelerator pedal is unactuated, rod 402 and valve spool 414 are at the depicted centered positions at which switch 406 is closed and solenoid valve 410 is energized to transmit the fluid pressure from line 410 on through signal routing valve 414a to the first signal outlet line 412b of that valve.

The three outlet lines 412b, 418 and 518 of signal routing valve 414a all connect with a forward-reverse logic valve 512a having a spool 512 which is biased leftwardly as viewed in FIG. 5 by a spring 514. At the leftward position of the spool, a spool groove 428 transmits the incoming pressure at line 412b to a line 430. From line 430 the fluid pressure passes through a three way check valve 432 and another three way check valve 434 to the set signal line 436 of low forward valve 438a of FIG. 4. Spool 438 of valve 438a then moves leftwardly and pressurizes clutch 15 and brake 16 to establish the low forward speed range in the manner previously described.

The reset signal line 456 of high forward valve 468a connects with outlet annulus 444 of the low forward valve 438a and the outlet annulus 444 is also communicated with reset signal line 462a of low reverse valve 466a through lines 446 and 458 and a three way check valve 460. Thus setting of the low forward valve 438a pressurizes the reset lines of high forward valve 468a and low reverse valve 466a.

Returning to FIG. 5, if the operator now depresses the accelerator pedal, rod 402 and valve spool 414 move leftwardly for the reasons previously described. The initial part of this movement opens switch 406 de-energizing solenoid valve 408 and terminating the set signal to the low forward valve 438a of FIG. 4 which then remains in the set condition until such time as a reset signal may be received.

Returning again to FIG. 5, if the operator then continues to depress the accelerator pedal and if upshifting is not inhibited by the torque limiting or underspeed mechanisms previously described because of load conditions, a low wheel torque limit or the like, a point is reached where an upshift from low forward range to high forward range is necessary. This shift point is signaled by reclosing of switch 406 by rod protusion 402b which re-energizes solenoid valve 408 readmitting fluid from line 410 to line 412. As valve spool 414 has at this point been shifted to the left by rod 402, the fluid is transmitted to outlet line 418 rather than to line 412a as in the previous instance.

From outlet line 418, the fluid passes through forward-reverse logic valve 512a at a groove 420 on the valve spool 512 and then to a high-low spool valve 506a through a line 422. Valve 506a has a spool 506 biased leftwardly, as viewed in FIG. 5, by a spring 508. At that position of the valve spool 506, a spool groove 424 transmits the fluid from line 422 to the set signal line 426 of the high forward valve 468a of FIG. 4. Spool 468 of the high forward valve 468a is thereby shifted leftward to the set position pressurizing and engaging clutch 484 through line 480 and three way check valve 482 and maintaining the engagement of clutch 15 through line 480 and three way check valve 448. The set signal pressure in line 426 is able to shift spool 468 in this manner as it acts against a larger area of the spool than the reset signal pressure which is present in spool chamber 470.

The reset signal line 492a of low forward valve 438a is then pressurized by fluid received from outlet annulus 478 of the high forward valve 468a through a line 488 and three-way check valve 490. This shifts spool 438 of the low forward valve back to the reset position thereby depressurizing brake 16 through line 446 and three-way check valve 450. As clutches 484 and 15 are now actuated, the transmission has been shifted to the high forward speed range.

After a momentary interval of time required to fill clutch 484, pressure rises in a high range signal line 502 which is connected between that clutch and chamber 504 at the end of spool 506 of the high-low valve 506a of FIG. 5. Spool 506 is then shifted rightwardly against spring 508 to condition the system for an eventual downshift from high forward speed range back to low forward. At this shifted condition of valve 506a, spool groove 424 now communicates line 422 with a downshift signal line 511 instead of the high forward valve set signal line 426.

As the operator continues to accelerate the vehicle up through the high forward speed range, rod 402 and valve spool 414 progressively shift back towards the centered positions depicted in FIG. 5 as dictated by the configuration of groove 365 of the cam plate 362 of FIG. 9. Returning to FIG. 5, switch 406 is open during this stage and therefore no fluid pressure is being supplied to any of the shift signal lines 518, 412a and 418 of the shift sequence 411. Such fluid is again supplied only when the vehicle has been partially decelerated to the extent where rod protrusion 402b has traveled back into register with switch actuator 406a signaling the need for a downshift from high forward speed range back to low forward. Closing of switch 406 at such time again energizes solenoid valve 408 to transmit a fluid pressure pulsation to line 422 through line 412, spool groove 416, line 418 and spool groove 420.

As the high low valve spool 506 has shifted to the right, the pressure pulsation is transmitted to downshift signal line 511 by spool groove 424. Three way check valve 434 transmits the pressure pulsation on to set signal line 436 of the low forward valve 438a of FIG. 4 which then shifts in the manner previously described to pressurize clutch 15 and brake 16 while transmitting a reset pressure to the high forward valve 468a thereby depressurizing clutch 484 and reestablishing the low forward speed range.

Shifting of the mode control valve 50 of FIG. 4 into the reverse setting pressurizes a reverse signal line 88. Line 88 communicates with a chamber 90 at the end of spool 512 of the forward-reverse logic valve 512a of FIG. 5. Spool 512 is thus shifted to the right as viewed in FIG. 5 when the transmission is in the reverse mode of operation.

The operation of the clutch control group 54 and shift sequencer 411 during reverse drive mode operation essentially parallels that described above with respect to the forward drive mode except that valves 466a and 546a of the control group 54, rather than valves 438a and 468a, are actuated by set signals from the shift sequencer 411. Thus with the operators accelerator pedal unoperated rod 402 and spool 414 are at the centered positions depicted in FIG. 5. Switch 406 is held closed energizing solenoid valve 408 to transmit a fluid pressure set signal to the low reverse valve set signal line 528 through line 412, spool groove 412a, line 412b, spool groove 428, line 524 and three way check valve 526. Low reverse valve 466a is thereby shifted to the set position at which pressure from inlet annulus 534 is transmitted to brakes 16 and 538 through line 539 and three way check valve 450 to establish the low reverse speed range. This also transmits pressure to the reset signal line 492a of low forward valve 438a through line 540 and three way check valve 490 while transmitting pressure to reset signal line 540a of high reverse valve 546a through line 540.

Referring again to FIG. 5, if the vehicle is speeded up in reverse to the point where an upshift to high reverse speed range is needed the condition is signaled in that rod protusion 402c recloses switch 406 energizing solenoid valve 408 to transmit pressure to line 412. Valve spool 414 has moved rightwardly at this stage causing a pressure pulsation to be transmitted to the high reverse valve set signal line 550 through spool groove 516, line 518, spool groove 520, line 522 and spool groove 548. Referring to FIG. 4, this shifts spool 546 of valve 546a to the left communicating the valve outlet annulus 554a with inlet annulus 554 and pressurizing brake 560 through line 558 and clutch 484 through line 558, three way check valve 482 and line 485. The spool movement also resets the low reverse valve 466a, depressurizing brakes 538 and 16, by pressurizing reset signal line 462a through line 562 and three way check valve 460 thereby establishing the high reverse mechanical speed range in the transmission.

As previously described in connection with a shift into high forward, the pressurization of clutch 484 also pressurizes high range signal line 502 causing the high low valve spool 506 of FIG. 5 to shift to the right thereby conditioning the system for the eventual downshift back to low reverse range.

Referring again to FIG. 5, slowing of the vehicle to the point where the downshift is needed is signaled by another closure of switch 406 by rod protusion 402c. Solenoid valve 408 is then again energized to transmit a pressure pulsation to line 522 through line 412, spool groove 516, line 518 and spool groove 520. As high-low valve spool 506 has been shifted to the right, pressure is again transmitted to the low reverse valve set signal line 528 through spool groove 548, line 568 and three way check valves 570 and 526. This sets the low reverse valve 466a of FIG. 4 and resets the high reverse valve 546a as previously described thereby reestablishing the reverse low range condition in the transmission.

From the foregoing and with reference again to FIG. 2, it may be seen that the control system 41 enables a very precise manual control of wheel torque and thus indirectly of ground speed but under conditions where ground speed may be automatically varied to assure conformity of wheel torque with the valve being called for by the operator through operation of accelerator pedal 128. The operator may set in a selected maximum wheel torque by positioning lever 92 and a maximum ground speed by positioning lever 206 when this appears desirable in view of ground condition, anticipated loads and changes of load on the engine and other factors which may make torque and ground speed limits advisable. After shifting mode selector lever 53 into forward or reverse, the operator may then control wheel torque, from zero up to the maximum set in by lever 92, with assurance that the wheel torque will match the value which is being selected at any given time by operating the accelerator pedal. Upshifts and downshifts between mechanical speed ranges are accomplished automatically without requiring attention by the operator. Engine underspeed from excessive loading and overly rapid vehicle deceleration are both automatically inhibited without requiring active intervention on the part of the operator. Throughout the various operations, a substantially constant engine speed is maintained to optimize fuel economy, reduce pollutant generation and minimize engine wear.

Many modifications of the control system are possible and it is not intended to limit the invention except as defined in the following claims.

The embodiments of the invention in which an exclusive property or privilege is claimed are defined as follows:

1. A control system for a transmission which has mechanical input and output sections with means for establishing a plurality of speed ranges and which has a hydrostatic section for infinitely varying the drive ratio of said transmission at each of said speed ranges, said hydrostatic section including first and second variable displacement fluid translating devices hydraulically coupled through first and second flow conduits, the control system comprising:

displacement adjustment means coupled to said hydrostatic section for upshifting said transmission in response to increases of a displacement signal and for downshifting said transmission in response to decreases of said displacement signal, output torque signal means coupled between said first and second flow conduits for producing an output torque signal having a magnitude which is a function of the fluid pressure differential therebetween, an accelerator member movable by an operator and a selected torque signal generator coupled to said member and having means for generating a selected wheel torque signal having a magnitude which is a function of the position of said accelerator member, and a displacement control coupled to said selected torque signal generator and said output torque signal means and said displacement adjustment means, said displacement control having means for producing said displacement signal and for modulating said displacement signal to maintain correspondance between said output torque signal and said selected wheel torque signal by adjusting said drive ratio.

2. The combination defined in claim 1 further comprising a maximum ground speed selector movable by an operator to establish a maximum output speed for said transmission and wherein said displacement control includes means for limiting the magnitude of said displacement signal to a selected value determined by the position of said maximum ground speed selector.

3. The combination defined in claim 1 further comprising a maximum wheel torque selector member movable by an operator to establish a maximum output torque for said transmission and wherein said selected torque signal generator further comprises means for limiting the magnitude of said selected torque signal to a selected maximum value determined by the position of said maximum wheel torque selector member, and means for adjusting said magnitude of said selected torque signal, by movement of said accelerator member, to any selected value within a range having said selected maximum value as an upper limit.

4. The combination defined in claim 1 wherein said transmission is driven by an engine which is operated at a substantially constant engine speed, further comprising means for producing an engine speed signal having a value proportional to the speed of said engine, and wherein said displacement control further includes underspeed means for decreasing said displacement signal to downshift said transmission in response to a decrease of said engine speed signal.

5. The combination defined in claim 4 wherein said displacement control further comprises overspeed means for inhibiting decreases of said displacement signal when said engine speed signal is increasing.

6. The combination defined in claim 3 further comprising means for producing a range upshift signal indicative of an upshift from one of said plurality of speed ranges to a higher speed range at said mechanical sections of said transmission, and override means which responds to said upshift signal by inactivating said means for limiting the magnitude of said selected torque signal to a selected maximum value.

7. The combination defined in claim 1 further comprising shift sequencer means for producing a range shift signal when said displacement signal reaches a predetermined value less than the maximum value thereof, and means for shifting said transmission from one of said plurality of speed ranges thereof to a higher one of said speed ranges in response to said range shift signal.

8. A control system for a transmission which has mechanical input and output sections with fluid pressure actuated drive conditioning devices for establishing a plurality of mechanical speed ranges and which has a hydrostatic section for infinitely varying the drive ratio of said transmission within each of said speed ranges, said hydrostatic section including first and second variable displacement fluid translating devices hydraulically coupled through first and second flow conduits, the control system comprising:
  displacement adjustment means coupled to said hydrostatic section for upshifting said transmission in response to increases of a fluid displacement signal pressure and for downshifting said transmission in response to decreases of said displacement signal pressure,
  output torque signal means coupled between said first and second flow conduits for producing an output torque signal fluid pressure indicative of the fluid pressure differential between said first and second flow conduits,
  an accelerator member movable by an operator and a selected torque signal generator coupled to said member and having means for generating a selected wheel torque fluid signal having a pressure which is a function of the position of said accelerator member, and
  a displacement control hydraulically coupled to said selected torque signal generator and said output torque signal means and said displacement adjustment means, said displacement control having means for producing said displacement signal pressure and for varying said displacement signal pressure to maintain correspondence between said output torque signal pressure differential and said selected wheel torque signal pressure.

9. A control system for a transmission as defined in claim 8 further comprising a source of pressurized control fluid and a manually adjustable maximum output torque selector member, and wherein said selected torque signal generator utilizes a portion of said control fluid to form said selected wheel torque signal and has a first modulatable pressure limiting valve disposed in the flow path of said portion of said control fluid and coupled to said maximum output torque selector member to limit the pressure of said selected wheel torque signal as a function of the setting of said maximum output torque selector member.

10. A control system for a transmission as defined in claim 9 wherein said selected torque signal generator has a second modulatable pressure limiting valve disposed in said flow path and coupled to said accelerator member to modulate the pressure of said selected wheel torque signal between a minimum value and the limit established by the setting of said maximum output torque selector member.

11. A control system for a transmission as defined in claim 10 further comprising means generating an upshift signal indicative of upshifting of said transmission from a lower one of said mechanical speed ranges to a higher one thereof, and wherein said selected torque signal generator further includes an override valve coupled to said flow path and which responds to said upshift signal by bypassing fluid flow around said first modulatable pressure limiting valve to inactivate the pressure limiting effect thereof when said transmission is in said higher one of said mechanical speed ranges thereof.

12. A control system for a transmission as defined in claim 8 further comprising a source of pressurized control fluid, and wherein said displacement control utilizes a portion of said control fluid to produce said displacement signal pressure and includes a torque limiting valve in the flow path of said portion of said control fluid, said torque limiting valve being spring-biased to a position at which said flow path is blocked and having pilot means wherein said selected wheel torque signal pressure acts to urge said valve away from said closed position to raise said displacement signal pressure and wherein said output torque signal fluid pressure acts to urge said valve in an opposite direction.

13. A control system for a transmission as defined in claim 12 further comprising a flow rate control valve also disposed in said flow path of said portion of said control fluid, pilot means for causing said selected wheel torque signal pressure to urge said flow rate control valve towards a position maximizing the flow rate therethrough, and additional pilot means for causing said displacement signal pressure to urge said flow rate control valve in an opposite direction.

14. A control system for a transmission as defined in claim 8 further comprising a pump drivable by the engine which drives said transmission for supplying pressurized control fluid, a venturi communicated with said pump for receiving at least a portion of the output flow therefrom and having a pair of venturi signal lines transmitting a pressure differential proportional to the speed of said engine, and wherein said displacement control utilizes said control fluid to produce said displacement signal pressure and has an engine underspeed valve including means for reducing said displacement signal pressure in response to a decrease of said pressure differential below a predetermined value.

15. A control system for a transmission as defined in claim 14 wherein said displacement control further includes an engine overspeed valve having means for delaying a decrease of said displacement signal pressure when said pressure differential is above said predetermined value.

16. A control system for a transmission as defined in claim 8 further comprising a source of pressurized control fluid and wherein said displacement control utilizes said control fluid to produce said displacement signal pressure and further includes a selectively variable pressure limiting valve disposed in the flow path of said control fluid for establishing a selectable maximum value for said displacement signal pressure, and an operator's maximum ground speed selector member coupled to said variable pressure limiting valve to enable selection of said maximum ground speed.

17. A control system for a transmission as defined in claim 8 wherein said transmission has a plurality of fluid pressure operated drive conditioning devices selected groups of which are pressurized to establish selected ones of said plurality of mechanical speed ranges, further comprising a source of pressurized control fluid, a plurality of speed range establishing valves each receiving said control fluid and each having outlet means communicated with an associated separate one of said groups of drive conditioning devices, each of said speed range establishing valves having means for directing said control fluid to said associated group of drive conditioning devices in response to a set signal and means for releasing control fluid from said associated group of drive conditioning devices in response to a reset signal, and means for generating said set signals and said reset signals at predetermined points in the travel of said displacement adjustment means.

* * * * *